(12) United States Patent
Zhou et al.

(10) Patent No.: US 11,782,813 B2
(45) Date of Patent: Oct. 10, 2023

(54) METHODS AND APPARATUS TO DETERMINE REFINED CONTEXT FOR SOFTWARE BUG DETECTION AND CORRECTION

(71) Applicant: Intel Corporation, Santa Clara, CA (US)

(72) Inventors: Shengtian Zhou, Palo Alto, CA (US); Justin Gottschlich, Santa Clara, CA (US); Fangke Ye, Santa Clara, CA (US); Celine Lee, Santa Clara, CA (US); Jesmin Jahan Tithi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/554,918

(22) Filed: Dec. 17, 2021

(65) Prior Publication Data

US 2022/0114076 A1 Apr. 14, 2022

(51) Int. Cl.
*G06F 11/36* (2006.01)
*G06N 3/08* (2023.01)

(52) U.S. Cl.
CPC ........ *G06F 11/3608* (2013.01); *G06F 11/362* (2013.01); *G06F 11/3688* (2013.01); *G06N 3/08* (2013.01)

(58) Field of Classification Search
None
See application file for complete search history.

(56) References Cited

U.S. PATENT DOCUMENTS

| 5,699,507 A * | 12/1997 | Goodnow, II | G06F 11/3604 |
| | | | 714/38.1 |
| 5,872,961 A * | 2/1999 | Sakuma | G06F 11/3656 |
| | | | 714/E11.214 |
| 9,081,595 B1 * | 7/2015 | Delarue | G06F 8/33 |
| 2004/0015747 A1 * | 1/2004 | Dwyer | G06F 11/3644 |
| | | | 714/47.1 |

(Continued)

OTHER PUBLICATIONS

Britton, T., et al., "Reversible Debugging Software 'Quantify the time and cost saved using reversible debuggers'", University of Cambridge: Judge Business School, Nov. 2020, 18 pages.

(Continued)

*Primary Examiner* — Andrew M. Lyons
(74) *Attorney, Agent, or Firm* — Hanley, Flight & Zimmerman, LLC

(57) ABSTRACT

Methods, apparatus, systems, and articles of manufacture are disclosed to determine refined context for bug detection. At least one non-transitory machine-readable medium includes instructions that, when executed, cause at least one processor to at least classify a node on a graph, the graph to represent a computer program, the node to contain partial bug context corresponding to the computer program; identify a location of a software bug in the computer program, the location based on the node; determine a static bug context of the software bug using the location of the software bug; determine a dynamic bug context of the software bug using the location of the software bug; and determine a refined bug context based on a merge of the static bug context and the dynamic bug context.

23 Claims, 13 Drawing Sheets

(56) References Cited

U.S. PATENT DOCUMENTS

| | | | | |
|---|---|---|---|---|
| 2007/0288899 | A1* | 12/2007 | Fanning | G06F 11/3616 |
| | | | | 717/124 |
| 2008/0244536 | A1* | 10/2008 | Farchi | G06F 8/433 |
| | | | | 717/130 |
| 2009/0259989 | A1* | 10/2009 | Cifuentes | G06F 11/3604 |
| | | | | 717/110 |
| 2010/0158407 | A1* | 6/2010 | Standfield | G06T 5/009 |
| | | | | 382/270 |
| 2010/0205592 | A1* | 8/2010 | Sankaranarayanan | |
| | | | | G06F 8/443 |
| | | | | 717/160 |
| 2012/0151453 | A1* | 6/2012 | Finking | G06F 11/3624 |
| | | | | 717/130 |
| 2012/0317554 | A1* | 12/2012 | Mulat | G06F 11/3608 |
| | | | | 717/131 |
| 2015/0363292 | A1* | 12/2015 | Shiraishi | G06F 11/3664 |
| | | | | 717/125 |
| 2017/0249234 | A1* | 8/2017 | Kalech | G06F 11/0793 |
| 2018/0246706 | A1* | 8/2018 | Fan | G06F 8/433 |
| 2018/0276562 | A1* | 9/2018 | Woulfe | G06N 3/0445 |
| 2019/0213107 | A1* | 7/2019 | Anaya | G06F 11/3612 |
| 2020/0065219 | A1* | 2/2020 | Bavishi | G06F 11/3608 |
| 2020/0097389 | A1* | 3/2020 | Smith | G06F 11/3612 |
| 2020/0167271 | A1* | 5/2020 | Zhang | G06F 8/75 |
| 2020/0226053 | A1* | 7/2020 | Meibusch | G06F 11/3086 |
| 2021/0255853 | A1* | 8/2021 | Zhou | G06F 8/75 |
| 2021/0303696 | A1* | 9/2021 | Weber | G06F 11/3604 |
| 2022/0308984 | A1* | 9/2022 | Zhao | G06N 3/0445 |

OTHER PUBLICATIONS

Gottschlich, J., et al., "The Three Pillars of Machine Programming," in 2018 ACM SIGPLAN Machine Learning and Programming Languages (MAPL), 9 pages.

Ye, F., et al., "MISIM: A Novel Code Similarity System," 2021, 22 pages.

Iyer, R., et al., "Software Language Comprehension using a Program-Derived Semantics Graph," in 2020 Conference on Neural Information Processing Systems (NeurIPS), Computer-Assisted Programming (CAP) Workshop, 11 pages.

Alon, U., et al., "code2vec: Learning Distributed Representations of Code," in POPL 2019, Cascais, Portugal, 30 pages.

Luan, S., et al., "Aroma: Code Recommendation via Structural Code Search," Proceedings of the ACM on Programming Languages, OOPSLA, vol. 3, 2019, 28 pages.

Ben-Nun, T., et al., "Neural Code Comprehension: A Learnable Representation of Code Semantics," In Proceedings of the 32nd International Conference on Neural Information Processing Systems (NeurIPS'18), 2018, 17 pages.

"Multi-label Classification," retrieved from https://en.wikipedia.org/wiki/Multi-label_classification, last updated Mar. 3, 2023, 7 pages.

"Tree-Sitter," retrieved from https://tree-sitter github.io/tree-sitter/ on May 15, 2023, 4 pages. GitHub Repository.

Parr, T., "Antlr," retrieved from https://www.antlr.org/ on May 15, 2023, 3 pages.

Hasabnis, N., et al., "ControlFlag: A Self-Supervised Idiosyncratic Pattern Detection System for Software Control Structures," in 2021 ACM SIGPLAN Machine Programming Symposium, 11 pages.

Alam, M., et al., "A Zero-Positive Learning Approach for Diagnosing Software Performance Regressions," in 2019 Conference on Neural Information Processing Systems (NeurIPS), 12 pages.

Moor, O.D., et al., ".QL: Object-Oriented Queries Made Easy," in Generative and Transformational Techniques in Software Engineering II, International Summer School, Braga, Portugal, 2007, 45 pages.

Pradel, M., et al., "DeepBugs: A Learning Approach to Name-based Bug Detection," Proceedings of the ACM on Programming Languages, vol. 2, No. OOPSLA, 2018, 23 pages.

Dinella, E., et al., "Hoppity: Learning Graph Transformations to Detect and Fix Bugs in Programs," in International Conference on Learning Representations (ICLR), 2020, 17 pages.

"Amazon CodeGuru," retrieved from https://aws.amazon.com/codeguru/ on May 15, 2023, 16 pages.

Marginean, A., et al., "SapFix: Automated End-to-End Repair at Scale," in 2019 IEEE/ACM 41st International Conference on Software Engineering: Software Engineering in Practice (ICSE-SEIP), 17 pages.

Weiser, M., "Program Slicing," IEEE Transactions on Software Engineering, vols. SE-10, No. 4, 1984, 11 pages.

Sutskever, I., et al., "Sequence to Sequence Learning with Neural Networks," NIPS, 2014, 9 pages.

"srcML," retrieved from https://www.srcml.org/ on May 15, 2023, 5 pages.

"Clang: a C language family frontend for LLVM," retrieved from https://clang.llvm.org/ on May 15, 2023, 2 pages.

"CppDepend," retrieved from https://www.cppdepend.com/Doc_VS_Arch on May 15, 2023, 17 pages.

"Fuzzing," retrieved from https://en.wikipedia.org/wiki/Fuzzing, last updated Apr. 7, 2023, 14 pages.

Babic, D., "Fudge: Fuzz Driver Generation at Scale," Proceedings of the 2019 27th ACM Joint Meeting on European Software Engineering Conference and Symposium on the Foundations of Software Engineering, ACM, 11 pages.

* cited by examiner

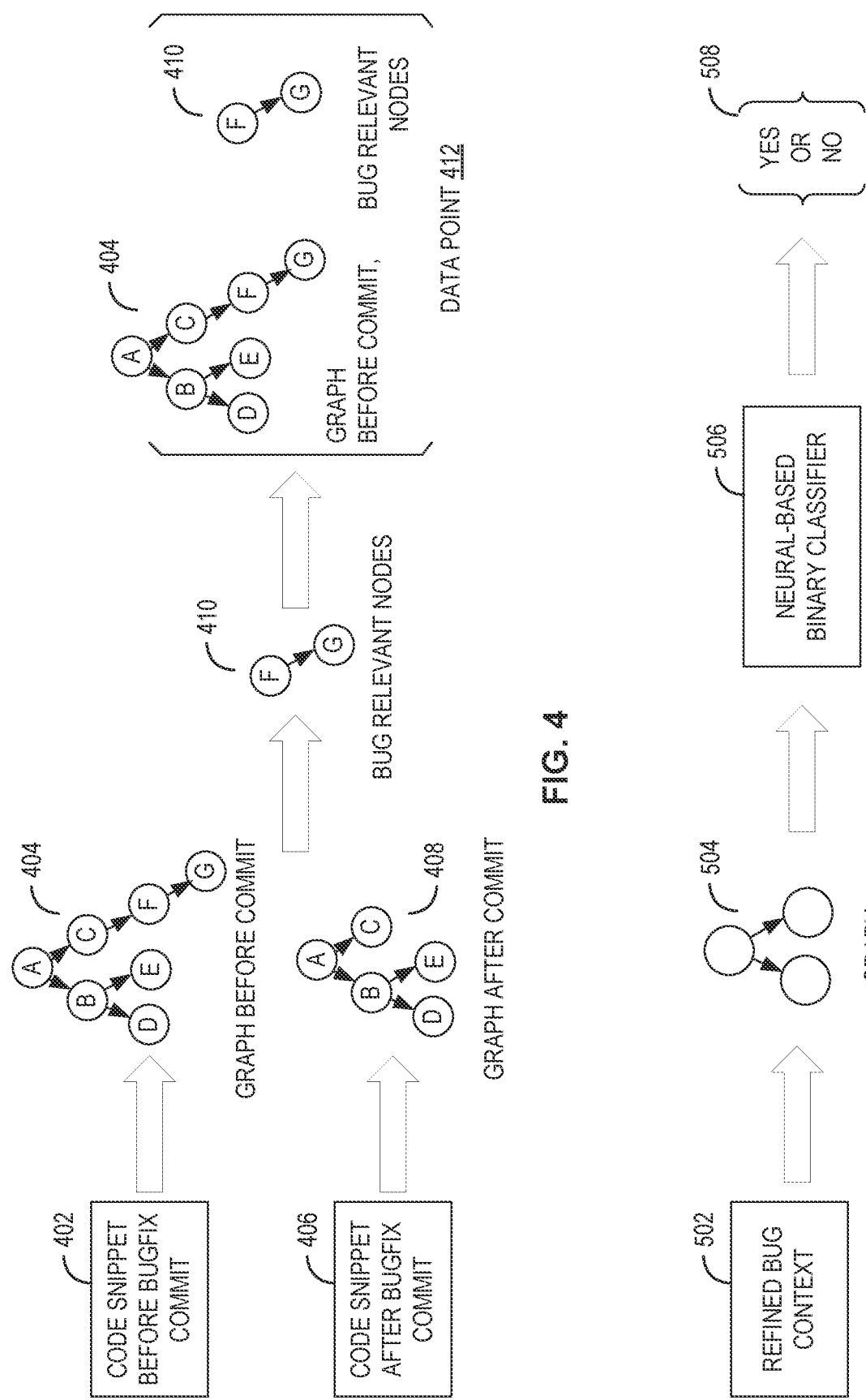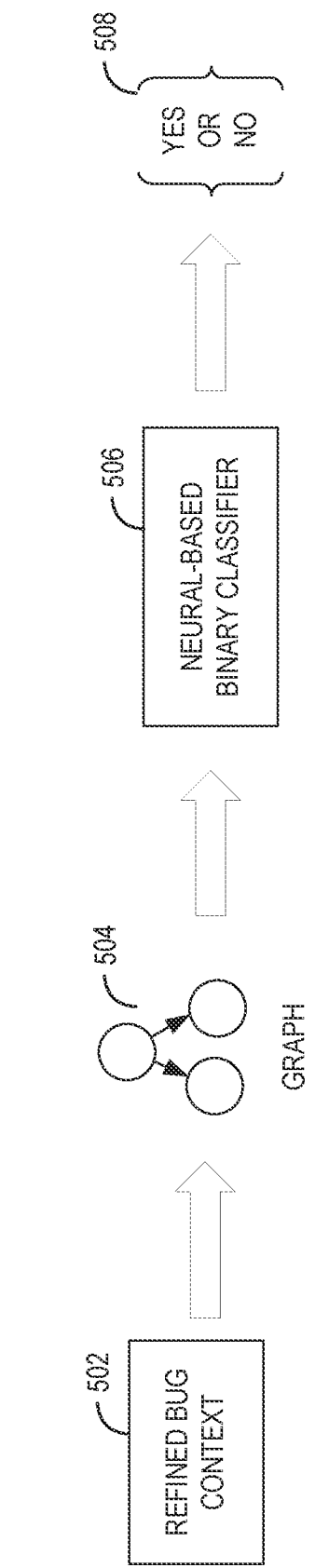

```
1   CLASS LISTMETADATA:
2   
3       DEF __INIT__(SELF):
4           # BUG: THIS SHOULD HAVE BEEN DECLARED IN THE SUM METHOD
5           SELF.RES = 0
6   
7       DEF SUM(SELF, NUMBER_LIST):
8           FOR ITEM IN NUMBER_LIST:
9               SELF.RES = SELF.RES + ITEM
10          RETURN SELF.RES
```

METHODS AND APPARATUS TO DETERMINE REFINED CONTEXT FOR SOFTWARE BUG DETECTION AND CORRECTION

FIELD OF THE DISCLOSURE

This disclosure relates generally to computers, and, more particularly, to methods and apparatus to determine refined context for software bug detection and correction.

BACKGROUND

In recent years, the use of software development has increased significantly across a wide variety of industries. Software developers use programming languages to write software code. Software code, or code, includes computer-readable instructions that are executed by a computer to perform a task. When writing code, software developers may inadvertently include a software bug. A software bug is an error, flaw, or fault in code that causes the code to produce an incorrect or unexpected result, or to behave in unintended ways.

BRIEF DESCRIPTION OF THE DRAWINGS

FIG. 4 is an illustrative example of graph representations of code showing how the example node classifier circuitry of FIG. 3 trains a model to detect nodes with partial bug context.

FIG. 5 is an illustrative example of graph representations of code showing how the example context verifier circuitry of FIG. 3 verifies that a refined bug context contains a software bug.

In general, the same reference numbers will be used throughout the drawing(s) and accompanying written description to refer to the same or like parts. The figures are not to scale.

Figure 1:
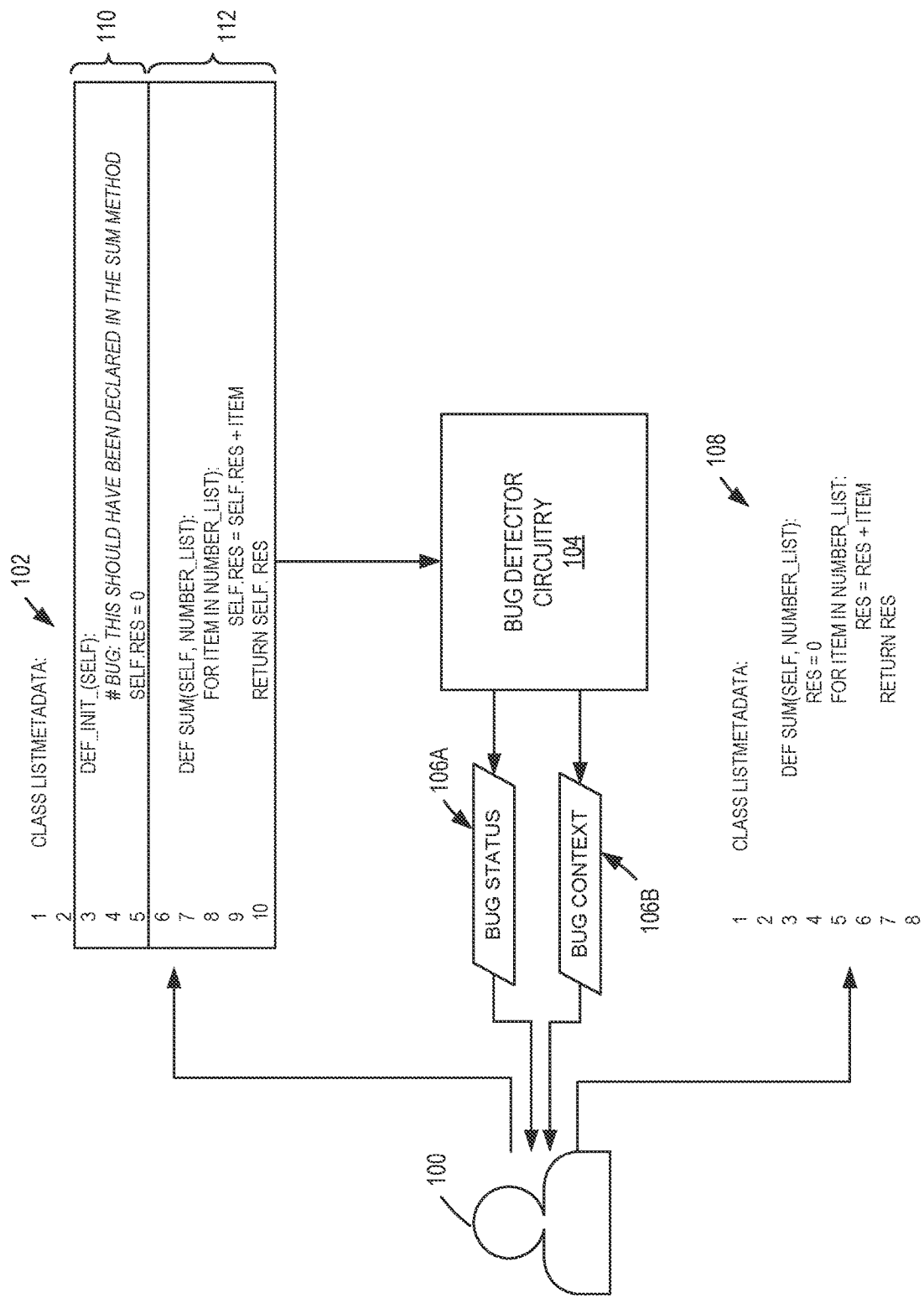
FIG. 1 is an example data set processed by example bug detector circuitry to determine refined context for software bug detection and/or correction.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As the use of software development has increased across industries, the field of machine programming has become increasingly relevant. In general, machine programming describes automating the development and maintenance of software. By automating software development, machine programming aims to make computer programs more effective and efficient than computer programs developed by traditional means, which rely more heavily on user input.

One method through which machine programming automates the maintenance of software is through bug detection. Bug detection systems may accept a portion of code (e.g., software, firmware, a computer program, lines of code of a computer program, etc.) and identify the presence and location of one or more syntactical, design, or logical bugs in a program. The accuracy of a bug detection system is dependent on the bug context represented by the input portion of code. A bug context is a portion of a computer program that relates to determining the root cause of a bug.

Previous solutions that attempt to determine bug context often identify a partial bug context. A partial bug context is a portion of a computer program that may relate to a bug but is too small to determine the root cause of a bug. Examples disclosed herein may be used to determine refined bug context. A refined bug context of an example bug may be larger than a partial bug context for the example bug obtained through previous solutions. Therefore, bug detection systems implemented in accordance with examples disclosed herein may use refined bug contexts to be more accurate when determining the root cause of the example bug. In turn, the amount of time taken to correct software bugs may be reduced.

FIG. 1 is an example data set processed by example bug detector circuitry 104 to determine refined contexts for software bug correction. FIG. 1 includes a user 100, an example input computer program 102, the example bug detector circuitry 104, example bug information 106, and a corrected computer program 108. The user 100 of FIG. 1 may be any individual who writes code. In some examples, the user 100 may write code as a software developer, a student, a hobbyist, etc.

The example input computer program 102 of FIG. 1 is an amount of code written by the user 100. The example input computer program 102 is illustrated in examples herein as a code snippet of 10 lines of code for simplicity. A code snippet generally refers to a small portion of code. A code snippet may, but is not required to be, part of a larger amount of code such as a computer program, software, firmware, etc. In some examples, the input computer program 102 may be any number of lines of code. Similarly, the input computer program 102 is illustrated as one file in FIG. 1 for simplicity. In some examples, the input computer program 102 may be multiple files.

The example input computer program 102 may be written in any programming language. A programming language is a set of commands, instructions, and other syntax use to create a software program. Example programming languages include but are not limited to Java, C, Python, C++, Visual Basic, C#, JavaScript, Perl, R, Hypertext Preprocessor (PHP), Structured Query Language (SQL), etc.

In the illustrated example, the input computer program 102 contains a software bug. In the example of FIG. 1, the input computer program 102 includes a variable "self.res". The software bug (commented as '#BUG' in FIG. 1) arises from the variable "self.res" being defined in an initialization method (DEF_INIT) rather than in a sum method (DEF SUM). In some examples, the software bug may include other lines of code and may have other content. The software bug may cause the input computer program 102 to fail to execute, to produce an incorrect or unexpected result, or to behave in unintended ways.

The example bug detector circuitry 104 receives the input computer program 102 and determines example bug information 106. Example bug information 106 includes a bug status 106A and may conditionally include a bug context 106B. The example bug status 106A indicates whether a software bug is present within the input computer program 102. In some examples, the example bug status 106A may additionally indicate the severity of a software bug by assigning labels to the software bug such as "warning" or "error". The bug context 106B is a portion of the input computer program 102 that is used to determine the root cause of the software bug. In some examples, if the input computer program 102 does not have a software bug, the example bug detector circuitry 104 may not provide a bug context 106B because there is no software bug for which to determine a root cause. The example bug information 106 is determined in accordance with examples disclosed herein.

The user 100 uses the example bug information 106 to determine the root cause of the software bug within the input computer program 102 and correct the bug. The corrected version of the input computer program 102 without software bugs is shown as an example corrected computer program 108. In the illustrated example, the user 100 corrects the example input computer program 102 by moving the declaration of the "self.res" variable (i.e., "res") into the sum function to create the corrected computer program 108. In some examples, the user 100 may make any number of changes to correct the software bug and create the corrected computer program 108. The example corrected computer program 108 produces an output or performs a task that the user 100 intended the input computer program 102 to produce or perform.

The example input computer program 102 of FIG. 1 is subdivided into a first code section 110 and a second code section 112 for illustrative purposes. The example second code section 112 represents a partial bug context, which relates to the software bug in the input computer program 102 but may not provide enough information to determine the root cause of the software bug. Previous solutions that attempt to determine the bug context 106B often determine only partial bug context. In contrast, the example bug detector circuitry 104 of FIG. 1 determines a refined bug context. In the example of FIG. 1, the first code section 110 and the second code section 112 collectively represent the refined bug context for the software bug in the input computer program 102. A refined bug context may refer to a larger portion of the example input computer program 102 than the partial bug context. The refined bug context facilitates the user 100 to more accurately determine the root cause of the software bug and more efficiently correct the software bug than a partial bug context. For example, the user 100 of FIG. 1 may determine that to correct the software bug, the declaration of the "res" variable from the example first code section 110 should be placed within the "sum" function of the second code section 112.

The refined bug context is illustrated in FIG. 1 to represent eight of the ten lines of code of the input computer program 102. In some examples, the refined bug context may represent a smaller portion of the input computer program 102. The portion size of the refined bug context relative to the input computer program 102 may change based on the total number of lines in the input computer program 102.

Figure 2:
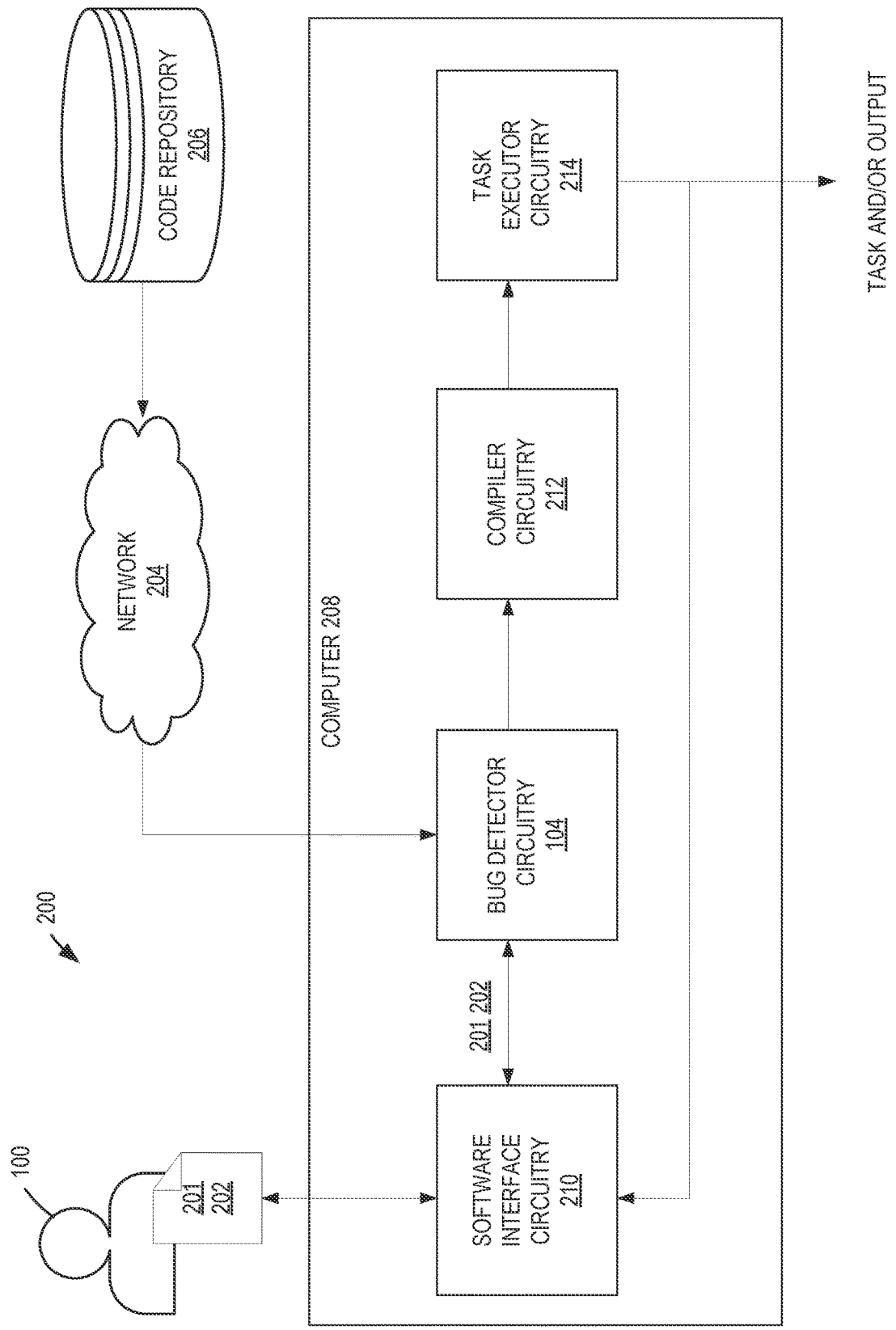
FIG. 2 is a block diagram of an example system to execute a task using the example bug detector circuitry of FIG. 1.

FIG. 2 is a block diagram of an example system 200 to execute a task using the example bug detector circuitry of FIG. 1. FIG. 2 includes the user 100, example input code 201, example reference code 202, an example network 204, an example code repository 206, and an example computer 208. The example computer 208 includes example software interface circuitry 210, example bug detector circuitry 104, example compiler circuitry 212, and example code executor circuitry 214. The example computer 208 in FIG. 2 determines whether the input code 201 contains software bugs, fixes the software bugs to generate corrected code, and executes the corrected code without software bugs to perform tasks. The example computer 208 may have additional and/or different components and perform additional and/or different functions other than those shown in and/or described in connection with FIG. 2. For example, the example computer 208 may be implemented by the processor platform 1200 of FIG. 12.

In the illustrated example, the software interface circuitry 210 accesses the input code 201. For example, the input code 201 may be provided by the user 100, and/or the software interface circuitry 210 may retrieve the input code 201 from memory. The input code 201 may contain one or more software bugs. The input code 201 may be of any length and may be written in any programming language. In some examples, the user 100 may receive example bug information 106 from the example computer 208 after providing the input code 201. In some such examples, the user 100 may correct one or more software bugs. For example, the input computer program 102 of FIG. 1 is an example of input code 201 because the software bug is not yet discovered when the example computer 208 initially accesses the input code 201.

The example network 204 of FIG. 2 connects and facilitates communication between the code repository 206 and the computer 208. In this example, the example network 204 is the Internet. However, the example network 204 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example code repository 206 is a data storage system that stores files in a directory structure. The example code repository 206 also contains metadata describing the files and directories within a version control system. In some examples, some or all of the files and directories in the code repository 206 are public. Public files and directories in a code repository may be accessed by anyone. In other examples, some or all of the files and directories in the code repository 206 are private. Private files and directories in a code repository may only be accessed by certain users or groups. Examples of code repositories include but are not limited to GitHub®, GitLab®, Bitbucket®, etc.

The example code repository 206 is implemented by any memory, storage device and/or storage disc for storing data such as, for example, flash memory, magnetic media, optical media, solid state memory, hard drive(s), thumb drive(s), etc. Furthermore, the data stored in the example code repository 206 may be in any data format such as, for example, binary data, comma delimited data, tab delimited data, structured query language (SQL) structures, etc. While, in the illustrated example, the code repository 206 is illustrated as a single device, the code repository 206 and/or any other data storage devices described herein may be implemented by any number and/or type(s) of memories.

In the illustrated example, the software interface circuitry 210 of FIG. 2 accesses the input code 201. In some examples, software applications such as a source-code editor and/or software compiler (e.g., an Integrated Development Environment (IDE)) implemented by the software interface circuitry 210 may additionally enable the user 100 to write code, edit code, submit commands or requests to check code for software bugs, and/or instantiate execution of code to perform a task. In other examples, the user 100 may write or edit code on a different machine separate from the computer 208. In some such examples, the user 100 may provide the code to the software interface circuitry 210 via a network or a memory storage device. The software interface circuitry 210 also provides example bug information 106. In some examples, the software interface circuitry 210 may additionally provide the output of a task for access by the user 100.

The example bug detector circuitry 104 receives the input code 201 from the software interface circuitry 210. The example bug detector circuitry 104 determines the bug status 106A (FIG. 1). If the example bug detector circuitry 104 determines a software bug is present in the input code 201, the example bug detector circuitry 104 additionally determines the bug context 106B (FIG. 1). To determine the bug status 106A and the bug context 106B, the example bug detector circuitry 104 accesses data from the code repository 206 via the example network 204. The example bug detector circuitry 104 may provide the example bug information 106 via the software interface circuitry 210. The example bug detector circuitry 104 may additionally provide reference code 202 to the compiler circuitry 212. Reference code 202 is input code 201 that has been processed by the example bug detector circuitry 104 and includes example bug information 106 produced by the example bug detector circuitry 104. In some examples, the example bug detector circuitry 104 provides reference code 202 to the compiler circuitry 212 in response to a determination that the included bug status 106A indicates the reference code 202 does not contain a software bug. Reference code 202 that does not contain a software bug may be referred to as verified code. For example, after the example corrected program 108 of FIG. 1 is accessed by the computer 208 and the example bug detector circuitry 104 produces a bug status 106A indicating the example corrected program 108 does not contain a software bug, the example corrected program 108 becomes an example of verified code. In other examples, the reference code 202 is provided to the compiler circuitry 212 regardless of the example bug status 106A. In some such examples, the reference code 202 may still contain a software bug. The example bug detector circuitry 104 is described in more detail below in connection with FIGS. 3-14.

The example compiler circuitry 212 of FIG. 2 receives verified code from the example bug detector circuitry 104 that does not have software bugs. The compiler circuitry 212 translates the verified code from its original programming language into machine instructions that may be used to execute a task. In some examples, the machine instructions may be referred to as machine code. The example compiler circuitry 212 provides the machine instructions to the code executor circuitry 214. In some examples, the example compiler circuitry 212 may include interpreter functionality such that examples disclosed herein may be implemented in connection with interpreted code (e.g., programming code that is interpreted into machine code at a time of execution) that may not need to be fully compiled in advance of execution. For example, while compiling a program is done in advance of execution time by compiling all of the instructions of that program into machine code and saving the machine code as an executable file for future execution, interpreter functionality translates programming language code to machine instructions at a time of execution (e.g., in real time, concurrent with program execution) without needing to compile an entire program and save all machine code for that program in advance of execution.

The example code executor circuitry 214 of FIG. 2 executes the machine instructions to perform the task described by the verified code without software bugs. In some examples, the task may produce an output. In some such examples, the output may be provided to the user 100 via the software interface circuitry 210.

If the input code 201 contains a software bug, the task described by the input code 201 may fail to execute, produce an incorrect or unexpected result, or behave in unintended ways. The example bug detector circuitry 104 detects and/or corrects such software bugs before the code executor circuitry 214 executes the input code 201. The example bug detector circuitry 104 generates a refined bug context, which contains a larger portion of relevant code that may be used to determine the root cause of a software bug than a portion of relevant code provided by previous solutions to identify the bug context 106B. As a result, the example bug detector circuitry 104 allows the user 100 to correct the software bug more efficiently than previous solutions.

Figure 3:
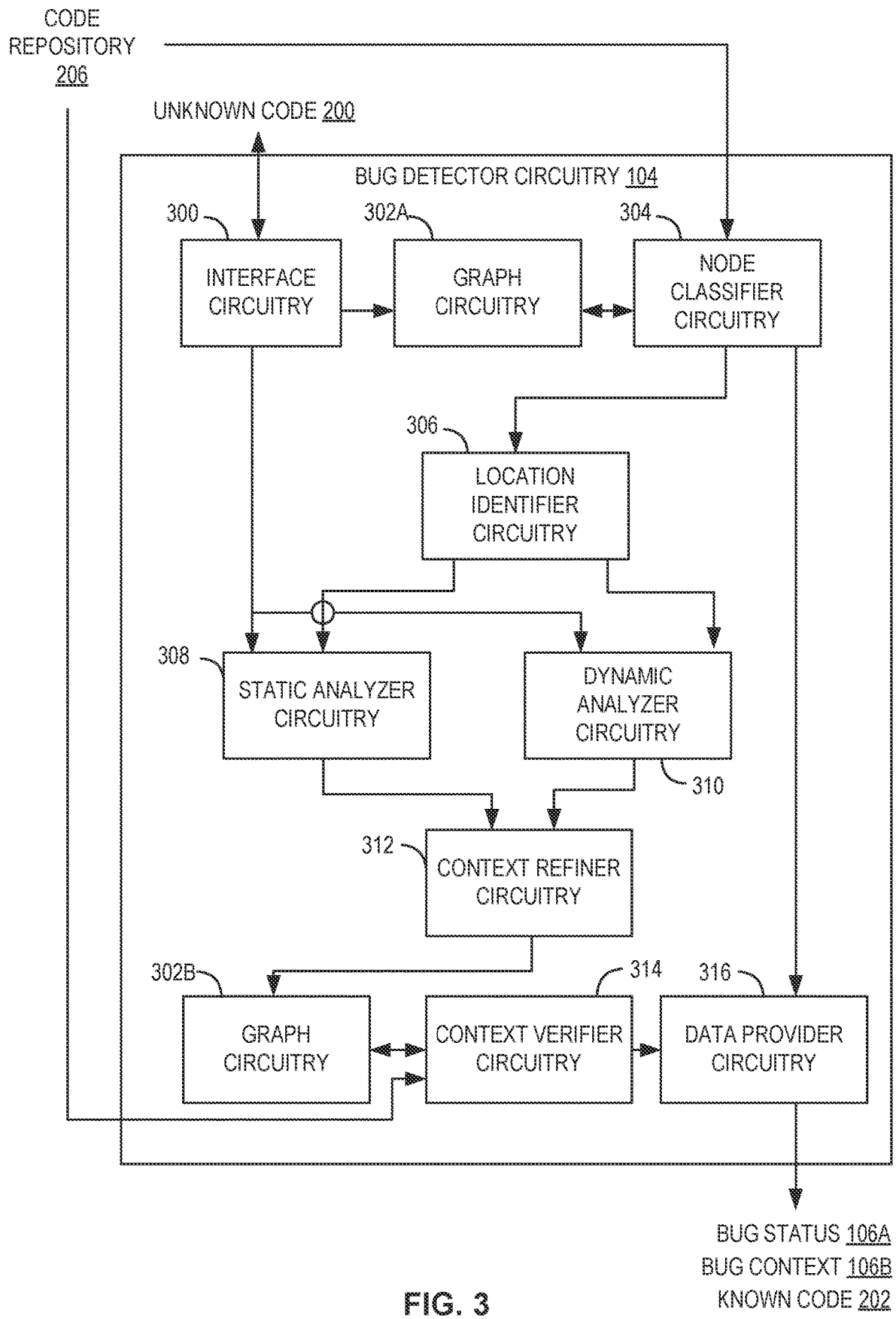
FIG. 3 is a block diagram of an example implementation of the example bug detector circuitry of FIG. 1.

FIG. 3 is a block diagram of the example bug detector circuitry 104 to determine a refined context for software bug detection and/or correction. The example bug detector circuitry 104 of FIG. 3 may be instantiated (e.g., creating an instance of, bring into being for any length of time, materialize, implement, etc.) by processor circuitry such as a central processing unit executing instructions. Additionally or alternatively, the example bug detector circuitry 104 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example bug detector circuitry 104 of FIG. 3 includes example interface circuitry 300, example graph circuitry 302A, example node classifier circuitry 304, example location identifier circuitry 306, example static analyzer circuitry 308, example dynamic analyzer circuitry 310, example context refiner circuitry 312, example graph circuitry 302B, example context verifier circuitry 314, and data provider circuitry 316.

The example interface circuitry 300 of FIG. 3 accesses input code 201 via the software interface circuitry 210 (FIG. 2). The example interface circuitry 300 provides the input code 201 to the example graph circuitry 302A.

The example graph circuitry 302A of FIG. 3 generates a graph to represent the input code 201. A graph is a data type that may represent non-linear relationships between objects. A graph includes nodes, which may also be referred to as vertices. A node is an object that contains data or information. Nodes are connected to one another by edges, which may also be referred to as arcs. A given edge has a start node and an end node. A given node may have multiple edges connecting to multiple nodes.

A graph created by the example graph circuitry 302A represents the input code 201. A node in the graph generated by the example graph circuitry 302A contains data that represents lines of code from the input code 201. The number of lines represented by a first example node may be different from the number of lines represented by a second example node. The nodes are connected according to how lines of code represented by the first example node relate to lines of code represented by the second example node. The lines of code represented by each node contain points of interest. A point of interest is part of a programming language architecture that may be relevant to a software bug. Example points of interest include but are not limited to variables, function calls, etc. In the input computer program 102, the variable "self.res" is a point of interest.

The example graph circuitry 302A may use any format or procedure to generate graphs. In some examples, the graph circuitry 302A generates a graph as a call graph. A call graph is a graph that represents relationships between subroutines in a computer program or code snippet. In some examples, the example graph circuitry 302A uses a Context Aware Semantic Structure (CASS) to generate graphs.

The example node classifier circuitry 304 of FIG. 3 accesses a graph generated by the example graph circuitry 302A and classifies nodes that are bug-relevant. A node classified as bug-relevant contains or is potentially related to a software bug. The example node classifier circuitry 304 implements a neural network to classify nodes. The neural network may be of any architecture. Example neural network architectures include but are not limited to Feed Forward Networks, Residual Networks, Convolutional Neural Networks, Generative Adversarial Networks, etc. Prior to classifying nodes representative of the input code 201, the example node classifier circuitry 304 trains the neural network using code snippets from the code repository 206.

The example node classifier circuitry 304 provides a result indicating whether any of the nodes were classified as bug-relevant to the data provider circuitry 316. The result may be referred to as the bug status 106A (FIG. 1) of the input code 201. The example node classifier circuitry 304 provides any nodes that are classified as bug-relevant to the example location identifier circuitry 306. The example node classifier circuitry 304 is described in more detail below in connection with FIG. 4.

The example location identifier circuitry 306 of FIG. 3 accesses nodes that have been classified as bug-relevant and identifies a location of a software bug. The location of a software bug is based on the snippets of code and points of interest represented by the classified nodes. The example location identifier circuitry 306 identifies the location based on mapping rules. A mapping rule is a set of instructions or algorithm that accepts a node and identifies which lines of code in the input code 201 are represented by data in the node. Mapping rules are helpful because the data stored in a node to represent lines of code may not directly indicate a line number. For example, suppose a first example node represents an example variable in an example program, and that the first example node is at a first location within the graph. Furthermore, suppose the second example node represents the same example variable but at a second different location within the graph. The example location identifier circuitry 306 may utilize a mapping rule to determine a set of lines of code in the example program which includes the example variable, and to further determine which lines of code from the set are represented by the first example node and which lines of code from the set are represented by the second example node. In some examples, mapping rules may be pre-defined as part of a programming language parsing tool. Examples of programming language parsing tools include but are not limited to a Source Markup Language (srcML™) tool and Clang™ tools.

In some examples, the example node classifier circuitry 304 classifies more than one node as relevant to a bug. In some such examples, the example location identifier circuitry 306 determines the location of the software bug to be the union of code locations. A union of code locations refers to the total collection of unique lines of code in the more than one code locations identified by the more than one node. For example, suppose a code location of a first example node included lines 1, 3, and 5 of an example computer program and a code location of a second example node included lines 4, 5, and 6 of the example computer program. In this example, the union of code locations would be lines 1, 3, 4, 5, and 6 of the example computer program. The location of the software bug may be referred to as the partial bug context because it may not provide sufficient context to determine the root cause of the software bug.

The example static analyzer circuitry 308 of FIG. 3 uses the location of the software bug and the input code 201 to determine a static bug context. A static bug context identifies the portions of the input code 201 that affect the behavior of the code identified in the location of the software bug. The example static analyzer circuitry 308 extracts an overestimated code context from the input code 201 and slices the overestimated bug context to determine the static bug context. The example static analyzer circuitry 308 provides the static bug context to the example context refiner circuitry 312. Program slicing is described in more detail below in connection with FIG. 6.

The example dynamic analyzer circuitry 310 of FIG. 3 uses the location of the software bug and the input code 201 to determine one or more dynamic bug contexts. A dynamic bug context is an execution path along the input code 201 that includes the partial bug context. The example dynamic analyzer circuitry 310 executes a program containing the partial bug context on a series of different inputs to determine the dynamic bug contexts. The example dynamic analyzer circuitry 310 provides the one or more dynamic bug contexts to the example context refiner circuitry 312. The example dynamic analyzer circuitry 310 is described in more detail below in connection with FIGS. 5 and 8.

The example context refiner circuitry 312 of FIG. 3 merges the static bug context and the dynamic bug context into a refined bug context. In some examples, the example context refiner circuitry 312 may identify a dynamic bug context from the one or more dynamic bug contexts having the most overlap with the static bug context. Overlap refers to the lines of code that are identified by both the static bug context and a dynamic bug context. For example, if the static bug context identified lines 2, 3, and 5 of an example computer program and a dynamic bug context identified lines 3, 4, and 5 of the example computer program, the overlap between the contexts would be lines 3 and 5, which is two lines of code in size. In some such examples, the example context refiner circuitry 312 considers the overlap of the identified dynamic bug context and the static bug context to be the refined bug context. In other examples, the example context refiner circuitry 312 of FIG. 3 merges the static bug context and the dynamic bug context into a refined bug context using other techniques. The example context refiner circuitry 312 provides the refined bug context to the example graph circuitry 302B. The example context refiner circuitry 312 is described in more detail below in connection with FIGS. 6 and 9.

The example graph circuitry 302B of FIG. 3 forms a graph of the portions of the input code 201 identified in the refined bug context. The procedure used by the example graph circuitry 302B to generate the graph of the refined bug context, may, but is not required to, match the procedure used by the example graph circuitry 302A to generate a graph of the input code 201. While the example graph circuitry 302B is illustrated separate from the graph circuitry 302A in FIG. 4, the example bug detector circuitry 104 may implement the example graph circuitry 302A and 302B together as a single component or may implement it as more, separate components. The example graph circuitry 302B provides the graph of the refined bug context to the example context verifier circuitry 314.

The example context verifier circuitry 314 of FIG. 3 verifies that the refined bug context contains a software bug. The example context verifier circuitry 314 may be implemented using a neural network trained to analyze refined bug contexts and confirm software bugs are present in the refined bug contexts. In some examples, the example context verifier circuitry 314 employs a neural network architecture that includes a graph neural network model used in a Machine Inferred Code Similarity (MISIM) engine. In some such examples, the MISIM engine may implement a binary classifier that is trained using committed code from the code repository 206. In other examples, the example context verifier circuitry 314 employs a different neural network architecture. The result of the determination of whether the refined bug context contains a software bug may confirm the bug status 106A originally determined by the example node classifier circuitry 304 or may update the bug status 106A to remove the indication of a software bug. The example context verifier circuitry 314 provides the bug status 106A and the refined bug context to the data provider circuitry 316.

The data provider circuitry 316 of FIG. 3 provides example bug information 106 (FIG. 1) to the user 100 (e.g., via the software interface circuitry 210 (FIG. 2)). The contents of the example bug information 106 may depend on whether the example node classifier circuitry 304 classified any bug-relevant nodes, and whether the example context verifier circuitry 314 successfully verified that the refined bug context contains a software bug. In some examples, the data provider circuitry 316 may additionally provide the reference code 202 to the compiler circuitry 212.

The example bug detector circuitry 104 extracts static bug context and one or more dynamic bug contexts to improve upon the partial bug context determined by the example location identifier circuitry 306. However, the example static analyzer circuitry 308 may contain code that is irrelevant to the software bug due to the limited performance of tools used to extract static bug context from the overestimated bug context. Furthermore, if the length of the input code 201 does not contain a sufficient number of lines of code, the example dynamic analyzer circuitry 310 may determine one or more dynamic bug contexts that are incomplete or contain false negatives. The number of lines of code that are required to be sufficient may change based on the points of interest in the input code 201. To overcome such inaccuracies, the example context refiner circuitry 312 determines a refined bug context using a merge of the static bug context and a dynamic bug context. The refined bug context is larger than the partial bug context and also mitigates the inclusion of code that is irrelevant to the software bug. As a result, the example bug detector circuitry 104 provides bug contexts that may help identify the root cause of the software bug more accurately and correct the software bug in less time than previous solutions.

In some examples, the example bug detector circuitry 104 includes means for accessing a computer program. For example, the means for accessing a computer program may be implemented by the example interface circuitry 300. In some examples, the example interface circuitry 300 may be instantiated by processor circuitry such as the example processor circuitry 1212 of FIG. 12. For instance, the example interface circuitry 300 may be instantiated by the example general purpose processor circuitry 1300 of FIG. 13 executing machine executable instructions such as that implemented by at least blocks 802 of FIG. 8. In some examples, the example interface circuitry 300 may be instantiated by hardware logic circuitry, which may be implemented by an ASIC or the FPGA circuitry 1400 of FIG. 14 structured to perform operations corresponding to the machine readable instructions. Additionally or alternatively, the example interface circuitry 300 may be instantiated by any other combination of hardware, software, and/or firmware. For example, the example interface circuitry 300 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for generating a graph. For example, the means for generating a graph may be implemented by the example graph circuitry 302A. In some examples, the example graph circuitry 302A may be instantiated by processor circuitry such as the example processor circuitry 1212 of FIG. 12. For instance, the example graph circuitry 302A may be instantiated by the example general purpose processor circuitry 1300 of FIG. 13 executing machine executable instructions such as that implemented by at least blocks 804 of FIG. 8. In some examples, the example graph circuitry 302A may be instantiated by hardware logic circuitry, which may be implemented by an ASIC or the FPGA circuitry 1400 of FIG. 14 structured to perform operations corresponding to the machine readable instructions. Additionally or alternatively, the example graph circuitry 302A may be instantiated by any other combination of hardware, software, and/or firmware. For example, the example graph circuitry 302A may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for classifying a node on a graph. For example, the means for classifying a node may be implemented by example node classifier circuitry 304. In some examples, the example node classifier circuitry 304 may be instantiated by processor circuitry such as the example processor circuitry 1212 of FIG. 12. For instance, the example node classifier circuitry 304 may be instantiated by the example general purpose processor circuitry 1300 of FIG. 13 executing machine executable instructions such as that implemented by at least blocks 806, 808, and 810 of FIG. 8. In some examples, example node classifier circuitry 304 may be instantiated by hardware logic circuitry, which may be implemented by an ASIC or the FPGA circuitry 1400 of FIG. 14 structured to perform operations corresponding to the machine readable instructions. Additionally or alternatively, the example node classifier circuitry 304 may be instantiated by any other combination of hardware, software, and/or firmware. For example, the example node classifier circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for identifying a location of a software bug. For example, the means for identifying a location of a software bug may be implemented by example location identifier circuitry 306. In some examples, the example location identifier circuitry 306 may be instantiated by processor circuitry such as the example processor circuitry 1212 of FIG. 12. For instance, the example location identifier circuitry 306 may be instantiated by the example general purpose processor circuitry 1300 of FIG. 13 executing machine executable instructions such as that implemented by at least blocks 812 of FIG. 8. In some examples, the example location identifier circuitry 306 may be instantiated by hardware logic circuitry, which may be implemented by an ASIC or the FPGA circuitry 1400 of FIG. 14 structured to perform operations corresponding to the machine readable instructions. Additionally or alternatively, the example location identifier circuitry 306 may be instantiated by any other combination of hardware, software, and/or firmware. For example, the example location identifier circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the tions without executing software or firmware, but other structures are likewise appropriate.

In some examples, the example bug detector circuitry 104 includes means for determining a static bug context. For example, the means for determining a static bug context may be implemented by the example static analyzer circuitry 308. In some examples, the example static analyzer circuitry 308 may be instantiated by processor circuitry such as the example processor circuitry 1212 of FIG. 12. For instance, the example static analyzer circuitry 308 may be instantiated by the example general purpose processor circuitry 1300 of FIG. 13 executing machine executable instructions such as that implemented by at least blocks 816, 900, 902 of FIGS. 7, 8. In some examples, the example static analyzer circuitry 308 may be instantiated by hardware logic circuitry, which may be implemented by an ASIC or the FPGA circuitry 1400 of FIG. 14 structured to perform operations corresponding to the machine readable instructions. Additionally or alternatively, the example static analyzer circuitry 308 may be instantiated by any other combination of hardware, software, and/or firmware. For example, the example static analyzer circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for determining a dynamic bug context. For example, the means for determining a dynamic bug context may be implemented by the example dynamic analyzer circuitry 310. In some examples, the example dynamic analyzer circuitry 310 may be instantiated by processor circuitry such as the example processor circuitry 1212 of FIG. 12. For instance, the example dynamic analyzer circuitry 310 may be instantiated by the example general purpose processor circuitry 1300 of FIG. 13 executing machine executable instructions such as that implemented by at least blocks 816, 904, 906 of FIGS. 7, 8. In some examples, the example dynamic analyzer circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the example dynamic analyzer circuitry 310 may be instantiated by any other combination of hardware, software, and/or firmware. For example, the example dynamic analyzer circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for determining a refined bug context. For example, the means for determining a refined bug context may be implemented by the example context refiner circuitry 312. In some examples, the example context refiner circuitry 312 may be instantiated by processor circuitry such as the example processor circuitry 1212 of FIG. 12. For instance, the example context refiner circuitry 312 may be instantiated by the example general purpose processor circuitry 1300 of FIG. 13 executing machine executable instructions such as that implemented by at least blocks 820 of FIG. 8. In some examples, the example context refiner circuitry 312 may be instantiated by hardware logic circuitry, which may be implemented by an ASIC or the FPGA circuitry 1400 of FIG. 14 structured to perform operations corresponding to the machine readable instructions. Additionally or alternatively, the example context refiner circuitry 312 may be instantiated by any other combination of hardware, software, and/or firmware. For example, the example context refiner circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example bug detector circuitry 104 includes means for verify a refined bug context. For example, the means for verifying a refined bug context may be implemented by the example context verifier circuitry 314. In some examples, the example context verifier circuitry 314 may be instantiated by processor circuitry such as the example processor circuitry 1212 of FIG. 12. For instance, the example context verifier circuitry 314 may be instantiated by the example general purpose processor circuitry 1300 of FIG. 13 executing machine executable instructions such as that implemented by at least blocks 822 of FIG. 8. In some examples, the example context verifier circuitry 314 may be instantiated by hardware logic circuitry, which may be implemented by an ASIC or the FPGA circuitry 1400 of FIG. 14 structured to perform operations corresponding to the machine readable instructions. Additionally or alternatively, the example context verifier circuitry 314 may be instantiated by any other combination of hardware, software, and/or firmware. For example, the example context verifier circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example data provider circuitry includes means for providing bug information. For example, the means for providing bug information may be implemented by the data provider circuitry 316. In some examples, the data provider circuitry 316 may be instantiated by processor circuitry such as the example processor circuitry 1212 of FIG. 12. For instance, the data provider circuitry 316 may be instantiated by the example general purpose processor circuitry 1300 of FIG. 13 executing machine executable instructions such as that implemented by at least blocks 824 of FIG. 8. In some examples, the data provider circuitry 316 may be instantiated by hardware logic circuitry, which may be implemented by an ASIC or the FPGA circuitry 1400 of FIG. 14 structured to perform operations corresponding to the machine readable instructions. Additionally or alternatively, the data provider circuitry 316 may be instantiated by any other combination of hardware, software, and/or firmware. For example, the data provider circuitry 316 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIG. 4 is an illustrative example of graph representations of code showing how the example node classifier circuitry 304 of FIG. 3 trains a model to detect nodes with a partial bug context. FIG. 4 includes a pre-commit code snippet 402, a pre-commit graph 404, a post-commit snippet 406, a post-commit graph 408, bug-relevant nodes 410, and a data point 412.

The example node classifier circuitry 304 uses version control metadata from the code repository 206. Version control metadata is information representative of and/or describing historical changes to files within the code repository 206. In a version control system, the changes made to a file across time and across users with access to the file may be tracked using commits. A commit represents a point in time when a user changed code in the file and saved the changes to the code repository 206. Rather than using the changes in the commit to overwrite the old contents of the file, the code repository 206 uses version control to store a first copy of the file that does not include the changes, which may be referred to as the file before the commit (e.g., a pre-commit file), and a copy of the file that does include the changes, which may be referred to as the file after the commit (e.g., a post-commit file). In addition, the example code repository 206 may store version control metadata in association with the changed file to describe the changes made in the file.

Users may make a commit for any reason. In many examples, a user may make commits to correct a software bug. The version control system in the example code repository 206 also includes techniques for users to indicate that a commit was made to correct a software bug. Example techniques include but are not limited to setting a flag variable or including key words in a string description of the commit. Example key words include but are not limited to "bug", "error", "fix", and "correct". Information that indicates a commit was made to correct a software bug may be stored in the version control metadata.

The pre-commit code snippet 402 of FIG. 4 is part or all of a file in the code repository 206 before a commit that corrects a software bug. Conversely, the post-commit code snippet 406 of FIG. 4 is part or all of the same file as the pre-commit code snippet 402 after the commit that corrects the software bug. To train the model used to classify unknown nodes as bug-relevant, the example node classifier circuitry 304 identifies the pre-commit code snippet 402 and the post-commit code snippet 406 from the code repository 206.

The example node classifier circuitry 304 may identify the pre-commit code snippet 402 and post-commit code snippet 406 using version control metadata that indicates a commit was made to correct a software bug. After using the version control metadata to determine that an example commit was made to correct a software bug, the example node classifier circuitry 304 may identify a file associated with the example commit, identify a most recent version of the file that was stored in the code repository 206 before the example commit, and identify a new version of the file that was stored in the code repository 206 when the example commit was made. The example node classifier circuitry 304 may identify part or all of the recent version of the file that was stored in the code repository 206 before the example commit to be the pre-commit code snippet 402. Similarly, the example node classifier circuitry 304 may identify the post-commit code snippet 406 as being part or all of a new version of the file that was stored in the code repository 206 because of the example commit. While a single instance of the pre-commit code snippet 402 is illustrated in FIG. 4 for simplicity, the example node classifier circuitry 304 identifies a pre-commit code snippet 402 for each data point 412 produced. The example node classifier circuitry 304 may identify any number of data points 412.

The example node classifier circuitry 304 provides the pre-commit code snippet 402 and the post-commit code snippet 406 to the example graph circuitry 302A (FIG. 3). The example graph circuitry 302A uses the pre-commit code snippet 402 to make the pre-commit graph 404 and the post-commit code snippet 406 to make the post-commit graph 408. The example graph circuitry 302A provides the pre-commit graph 404 and the post-commit graph 408 to the example node classifier circuitry 304.

The example node classifier circuitry 304 compares the pre-commit graph 404 to the post-commit graph 408 to identify bug-relevant nodes 410. A bug-relevant node is a node that has changed between the pre-commit graph 404 and the post-commit graph 408. Because the pre-commit graph 404 represents a file that includes a software bug, and the post-commit graph 408 represents the same file after the software bug has been corrected, any node that has changed between the graphs (e.g., a bug-relevant node) may represent lines of code within the file that were added, removed, or generally edited to correct a software bug. For example, in the illustrative example of FIG. 4, the bug-relevant nodes 410 are labeled 'F' and 'G' because said nodes were included in the pre-commit graph 404 but not included in the post-commit graph 408 and therefore represent lines of code that may have been removed to correct a software bug. Furthermore, a node that was not included in the first graph but was included in the post-commit graph 408 may be considered a bug-relevant node because it represents lines of code that may have been added to correct a software bug.

The example node classifier circuitry 304 considers the pre-commit graph 404 and the bug-relevant nodes 410 to collectively be a data point 412. Multiple instances of data points 412 may be produced by the example node classifier circuitry 304 to create training data. The example node classifier circuitry 304 uses the training data on a neural network to create a model that accepts input code 201, represented in the training data by the pre-commit graph 404, to identify bug-relevant nodes 410.

The example node classifier circuitry 304 uses the training data to train a neural network. The neural network may be of any architecture. In some examples, the neural network is a sequence to sequence neural network. In some such examples, after training the neural network is complete, the example node classifier circuitry 304 implements the sequence to sequence neural network to take a sequence of nodes from a graph representing the input code 201. The sequence of nodes may be obtained through any graph traversal technique. Examples of graph traversal techniques include but are not limited to depth first traversal, breadth first traversal, etc. The sequence of nodes is used as an input to the neural network, which produces a sequence of values between 0 and 1. In some such examples, a given number in the sequence represents a probability that the corresponding node contains or is relevant to a software bug. In some such examples, the sequence of values are compared to a threshold value to determine which nodes are bug-relevant. The example node classifier circuitry 304 is described in more detail below in connection with FIG. 8.

FIG. 5 is an illustrative example of graph representations of code showing how the example context verifier circuitry 314 of FIG. 3 verifies that a refined bug context contains a software bug. FIG. 5 includes an example refined bug context 502, an example graph 504, an example binary classifier 506, and an example output 508.

The example refined bug context 502 of FIG. 5 is generated by the example context refiner circuitry 312 (FIG. 3). In some examples, the refined bug context 502 contains a software bug. However, the tools used to create the refined bug context 502 may produce false positives for some inputs. Therefore, in other examples, the refined bug context 502 does not contain a software bug.

The example context refiner circuitry 312 provides the refined bug context 502 to the example graph circuitry 302B to generate the graph 504. The example graph 504 represents the portions of the input code 201 that are included in the refined bug context 502.

The example context verifier circuitry 314 uses the graph 504 as an input to a binary classifier 506. The example binary classifier 506 analyzes the graph 504 to produce the output 508. The example output 508 is a binary value that describes whether the refined bug context 502 contains a software bug. The output 508 may be any binary value(s) that describes the bug status of the refined bug context 502. Example binary values may be Yes and No, True and False, etc.

Before the example bug detector circuitry 104 (FIGS. 1-3) accepts the input code 201, the example context verifier circuitry 314 trains a neural network to implement the binary classifier 506. Similar to the example node classifier circuitry 304, the example context verifier circuitry 314 may utilize version control systems in the code repository 206 as described above to train the neural network used to implement the binary classifier.

The neural network used to implement the example binary classifier 506 may be of any architecture. In some examples, the neural network architecture includes a graph neural network used in a MISIM engine. When the example binary classifier 506 is executed, the graph neural network may accept the graph 504 to produce a real valued vector representation of the graph 504. The real valued vector representation may be utilized by a single neuron that uses a sigmoid activation function to produce the output 508. In some examples, the sigmoid activation function maps the real valued vector representation to a scalar value between 0 and 1. In some such examples, the scalar value is compared to a threshold value to produce the output 508.

Figure 6:
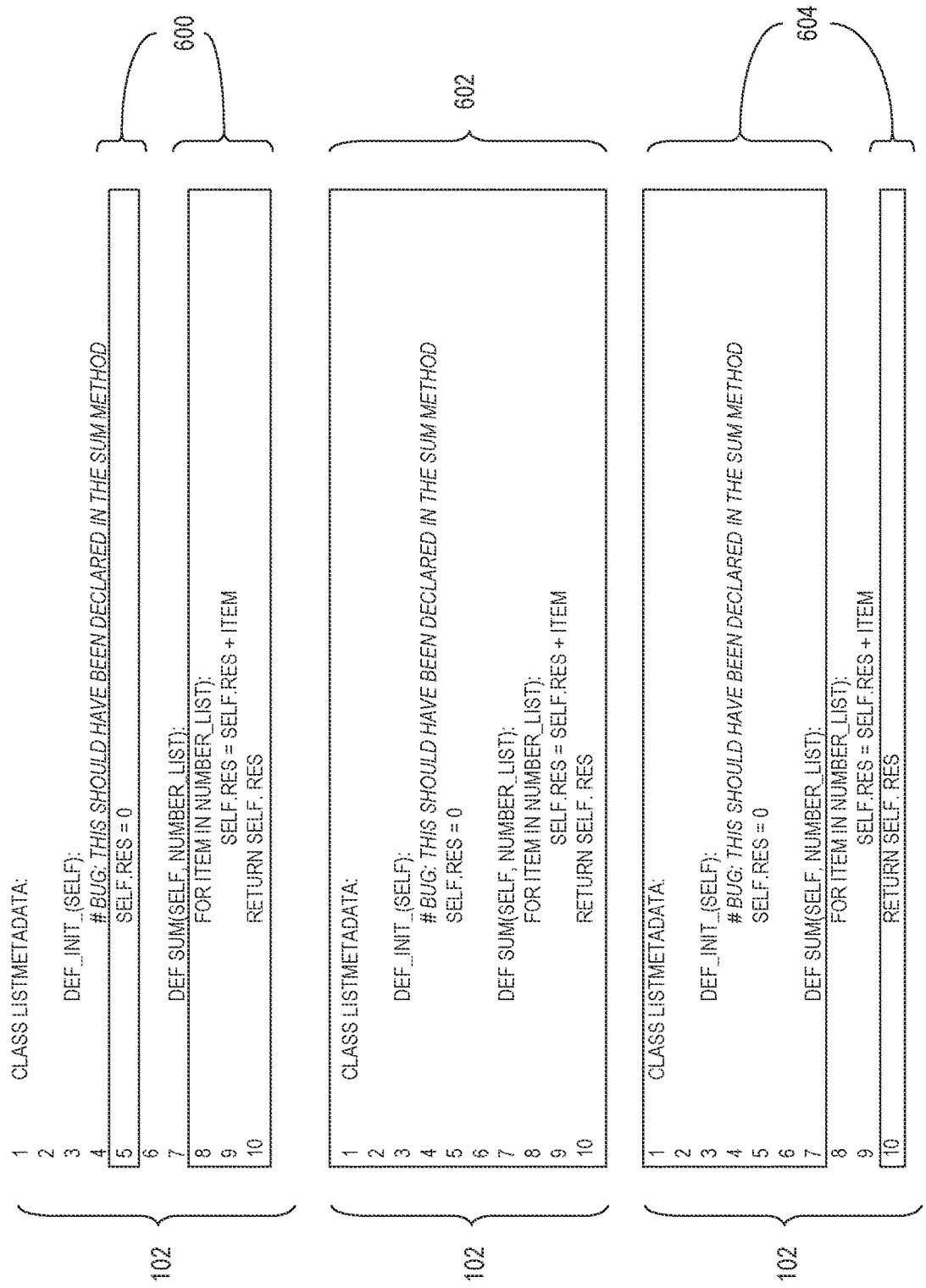
FIG. 6 is an illustrative example of a static bug context and dynamic bug contexts in code snippets.

FIG. 6 is an illustrative example of a static bug context and dynamic bug contexts in code snippets. FIG. 6 includes the input computer program 102, an example static bug context 600, an example first dynamic bug context 602, and an example second dynamic bug context 604.

The example static bug context 600 represent the portions of the input computer program 102 that affect the behavior of the code identified as the location of the software bug. The example static analyzer circuitry 308 determines the static bug context by first determining an overestimated bug context. An overestimated bug context refers to all the code within any of the functions that influence code in the location of the software bug. For example, the bug-relevant node of the input computer program 102 may identify the "self.res" variable as a point of interest. Because self res is referenced in both the initialization function and the sum function, the overestimated bug context of the input computer program 102 may be lines 3-5 and lines 7-10. In some examples, the example static analyzer circuitry 308 (FIG. 3) may identify the overestimated bug context using tools such as the Clang™ static analysis program or CppDepend™ static analysis program.

The example static analyzer circuitry 308 slices the overestimated bug context to determine a static bug context. The overestimated bug context is sliced to remove portions of code that do not affect a point of interest within the partial bug context. In some examples, the example static analyzer circuitry 308 may use any suitable program slicing tools to slice the overestimated bug context. In other examples, the example static analyzer circuitry 308 may use other tools to slice the overestimated bug context.

In examples where lines 3-5 and lines 7-10 are identified to be the overestimated bug context of the input computer program 102, example static analyzer circuitry 308 may further slice lines 3, 4, 6, and 7 from the overestimated bug context because they do not directly affect the "self res" variable. Therefore, the static bug context 600 of the input computer program 102 is illustrated in FIG. 6 as lines 3, 8, 9, and 10. In other examples, the static bug context may be a different number of lines at different locations in the input computer program 102.

A dynamic bug context represents the portions of the input computer program 102 that are executed under a single test condition. A test condition refers to the set of variable states and inputs, that, when implemented within a program, cause the program to run on a specified execution path. The example dynamic analyzer circuitry 310 generates one or more test conditions with a goal of recording all possible execution paths that include the location of the software bug into dynamic bug contexts. In some examples, the example dynamic analyzer circuitry 310 may implement automatic test case generation tools such as Fuzz Driver Generation at Scale (FUDGE) to generate the one or more test conditions. The example dynamic analyzer circuitry 310 uses each of the one or more test conditions as inputs to the input computer program 102. The example dynamic analyzer circuitry 310 records the execution path when running the input computer program 102 with a given test condition. An execution path refers to a sequence of lines of code within a program that were executed by processor circuitry when the program was run. The lines of code recorded to form the execution path may be considered a dynamic bug context.

An example of the example dynamic analyzer circuitry 310 is illustrated in FIG. 6. The example first dynamic bug context 602 uses a first set of test conditions as an input. The first set of test conditions are set so that the "item" and "number_list" variables cause execution flow to enter the for loop of lines 8 and 9. As a result, every line of the input computer program 102 is executed with the first set of test conditions, and the first dynamic bug context 602 includes lines 1-10. The second dynamic bug context 604 uses a second set of test conditions as an input. In contrast to the first set of test conditions, the second set of test conditions are set so that the "item" and "number_list" variables cause execution flow to not enter the for loop of lines 8 and 9. As a result, lines 8 and 9 are not executed in the input computer program 102 when executed with the second set of test conditions, and the second dynamic bug context 604 includes lines 1-7 and 10.

Figure 7:
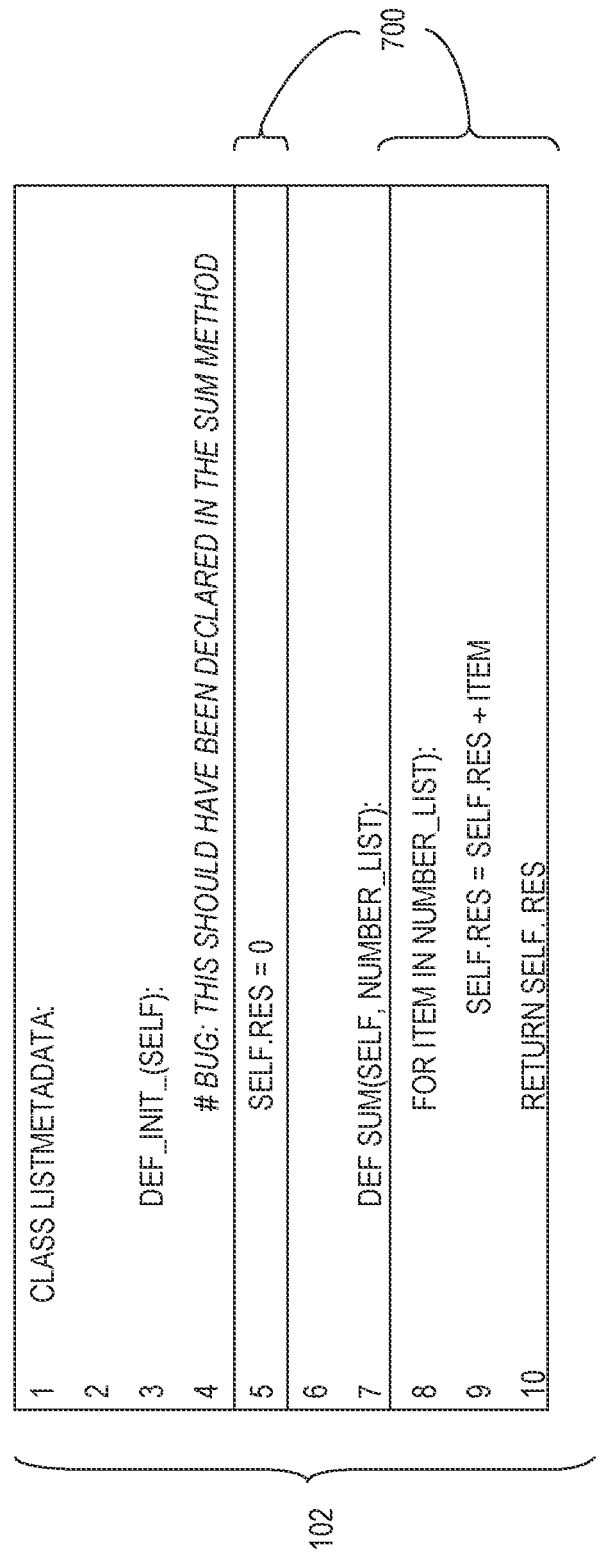
FIG. 7 is an illustrative example of a refined bug context of a code snippet.

FIG. 7 is an illustrative example of a refined bug context of a code snippet. FIG. 7 includes the input computer program 102 and a refined bug context 502.

The example context refiner circuitry 312 (FIG. 3) accesses the static bug context from the example static analyzer circuitry 308 (FIG. 3) and the one or more dynamic bug contexts from the dynamic bug context from the example dynamic analyzer circuitry 310 (FIG. 3). The example context refiner circuitry 312 merges the static bug context and the dynamic bug context to determine a refined bug context through any technique. In some examples, the example context refiner circuitry 312 compares the static bug context to the one or more dynamic bug contexts to produce an overlap bug context for each dynamic bug context. In some such examples, the overlap bug context that contains the greatest portion of code may be referred to as the refined bug context.

An example of a refined bug context can be found in FIG. 7 where the example static analyzer circuitry 308 (FIG. 3) utilizes the static bug context 600, the first dynamic bug context 602, and the second dynamic bug context 604 of FIG. 6. As shown in the example of FIG. 7, the overlap of the static bug context 600 and the first dynamic bug context 602 includes lines 5, 8, 9 and 10. In contrast, the overlap of the static bug context 600 and the second dynamic bug context 604 is only lines 5 and 10 because execution flow skipped the for-loop as described in FIG. 6. As a result, the example context refiner circuitry 312 selects lines 5, 8, 9 and 10 to be the refined dynamic bug context 700.

While an example manner of implementing the example bug detector circuitry 104 of FIG. 1 is illustrated in FIG. 3, one or more of the elements, processes, and/or devices illustrated in FIG. 3 may be combined, divided, re-arranged, omitted, eliminated, and/or implemented in any other way. Further, the example interface circuitry 300, the example graph circuitry 302, the example node classifier circuitry 304, the example location identifier circuitry 306, the example static analyzer circuitry 308, the example dynamic analyzer circuitry 310, the example context refiner circuitry 312, the example context verifier circuitry 314, the example data provider circuitry 316, and/or, more generally, the example bug detector circuitry 104 of FIG. 1, may be implemented by hardware alone or by hardware in combination with software and/or firmware. Thus, for example, any of the example interface circuitry 300, the example graph circuitry 302, the example node classifier circuitry 304, the example location identifier circuitry 306, the example static analyzer circuitry 308, the example dynamic analyzer circuitry 310, the example context refiner circuitry 312, the example context verifier circuitry 314, the example data provider circuitry 316, and/or, more generally, the example bug detector circuitry 104 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example bug detector circuitry 104 of FIG. 1 may include one or more elements, processes, and/or devices in addition to, or instead of, those illustrated in FIG. 3, and/or may include more than one of any or all of the illustrated elements, processes and devices.

Flowcharts representative of example hardware logic circuitry, machine readable instructions, hardware implemented state machines, and/or any combination thereof for implementing the example bug detector circuitry 104 of FIG. 1 are shown in FIGS. 7-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-11, many other methods of implementing the example bug detector circuitry 104 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 8, 9, 10, and 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
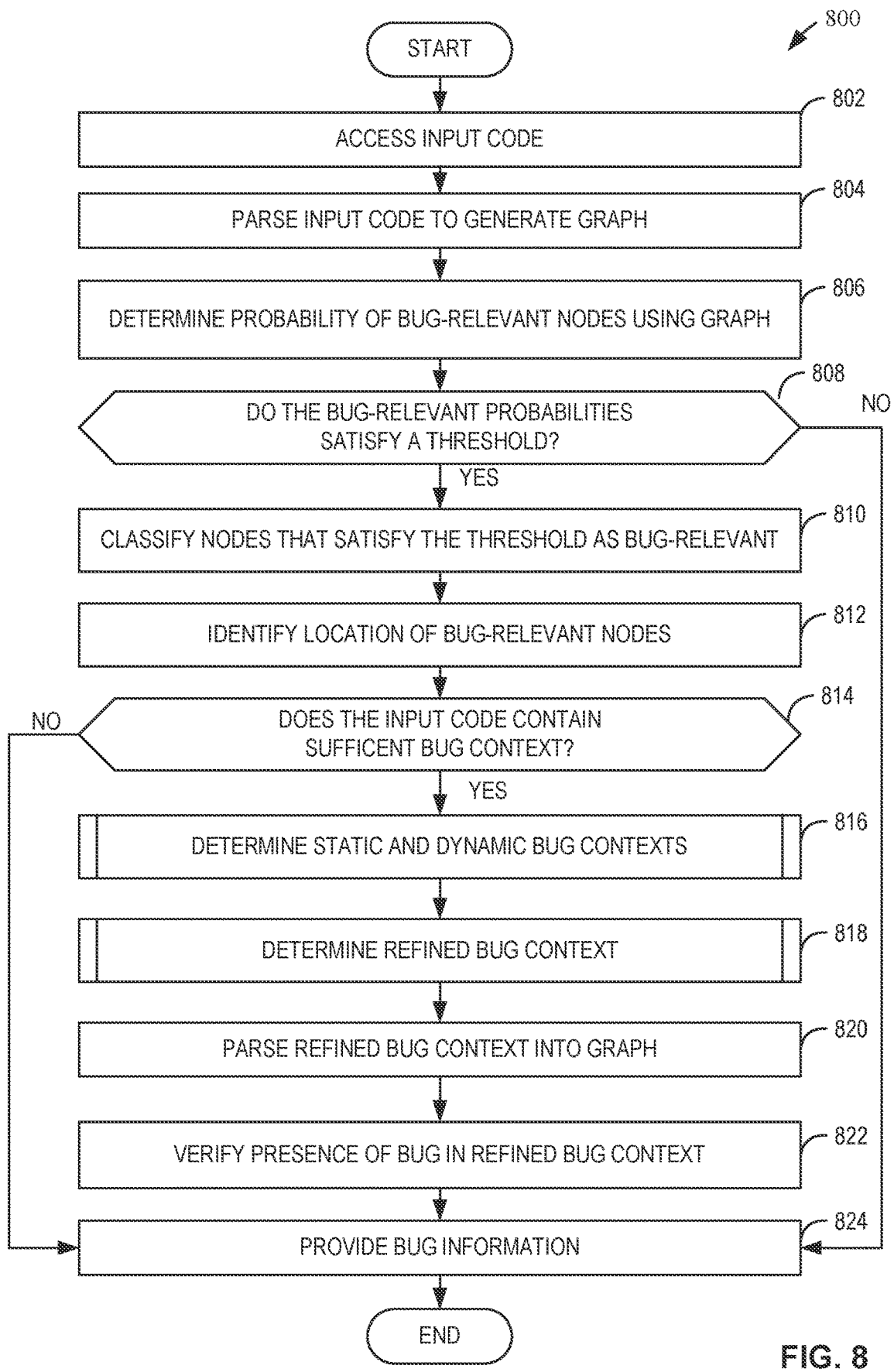
FIG. 8 is a flowchart representative of example machine readable instructions that may be executed by example processor circuitry to implement the example bug detector circuitry of FIG. 1 to determine bug status and refined bug contexts.

FIG. 8 is a flowchart representative of example machine readable instructions that may be executed by example processor circuitry to implement the example bug detector circuitry 104 of FIGS. 1, 2, and 3 to determine bug status and refined bug context. The example process 800 begins when the example interface circuitry 300 (FIG. 3) accesses input code 201 (FIG. 2). (Block 802). For example, input code 201 is provided by the software interface circuitry 210 (FIG. 2).

The example graph circuitry 302A (FIG. 3) parses the input code 201 to generate a graph. (Block 804). For example, the graph includes nodes, which contain portions of code from the unknown code, and edges, which connect the nodes and describe how the portions of code within the nodes relate to one another within the input code 201. The example graph circuitry 302A may use any format or procedure to generate graphs. In some examples, the example graph circuitry 302A uses a Context Aware Semantic Structure (CASS) to generate graphs.

The example node classifier circuitry 304 (FIG. 3) determines the probability of bug-relevant nodes using the graph generated at block 804. (Block 806). For example, before the example process 800 begins and the example bug detector circuitry 104 accesses the input code 201, the example node classifier circuitry 304 trains a neural network model to classify nodes as bug-relevant as described above. During the example process 800, the example node classifier circuitry 304 applies the neural network model to determine a bug-relevant probability for each of the nodes. The bug-relevant probability for a given node describes the probability that a portion of code in the node contains or is relevant to a software bug. In some examples, the bug-relevant probability is expressed as a scalar value between 0 and 1.

The example node classifier circuitry 304 determines whether the bug-relevant probabilities satisfy a threshold. (Block 808). For example, the threshold of block 808 is satisfied when one or more of the bug-relevant probabilities is greater than or equal to a threshold probability. An example threshold probability can be selected based on a desired sensitivity to bug detection. For example, a lower threshold may cause the example node classifier circuitry 304 to identify a greater number of code snippets that do not have software bugs as bug-relevant, thereby generating more false-positives. In contrast, a higher threshold may cause the example node classifier circuitry 304 to generate less false positives. However, the higher threshold may also cause the example node classifier circuitry 304 to miss-identify code snippets that contain software bugs as not bug-relevant.

In some examples, the example node classifier circuitry 304 may store the threshold value in a configuration file in memory. The threshold probability may be any value. In some examples, the threshold probability is 0.5. In other examples, the threshold probability is a different value. If at block 808 the example node classifier circuitry 304 determines the bug-relevant probabilities do not satisfy the threshold, the example instructions or process 800 proceeds to block 824.

If at block 808 the example node classifier circuitry 304 determines the bug-relevant probabilities do satisfy the threshold, the example node classifier circuitry 304 classifies nodes that satisfy the threshold as bug-relevant. (Block 810). To classify nodes that satisfy the threshold, the example node classifier circuitry 304 classifies nodes whose bug-relevant probability was greater or equal to the threshold probability of block 808. A node classified as bug-relevant indicates the code corresponding to the node may potentially contain or be relevant to a software bug.

The example location identifier circuitry 306 (FIG. 3) identifies the location of the software bug. (Block 812). The example location identifier circuitry 306 uses bug-relevant nodes of block 810 to determine the location of the software bug. In examples where more than one node is classified as bug-relevant, the union of code locations represented by the bug-relevant nodes is considered the location of the software bug. The identified portions of the input code 201 may be referred to as a partial bug context. The example location identifier circuitry 306 may identify the portions of the unknown code using mapping rules.

The example location identifier circuitry 306 determines whether the input code 201 contains sufficient bug context. (Block 814). Sufficient bug context refers to a portion of the code that is sufficient to determine the root cause of a software bug. In some examples, the example location identifier circuitry 306 may make the determination by determining whether total number of lines of code in the input code 201 is greater than the number of lines of code identified by the partial bug context by a target value. In other examples, the example location identifier circuitry 306 may make the determination by determining whether the number of functions, methods, or files within the input code 201 meets or exceeds a target value. If the example location identifier circuitry 306 determines that the unknown code does not contain sufficient bug context, the example instructions and/or process 800 proceed to block 824.

If the example location identifier circuitry 306 determines at block 814 that the input code 201 does contain sufficient bug context, the example static analyzer circuitry 308 (FIG. 3) determines a static bug context and the example dynamic analyzer circuitry 310 (FIG. 3) determines one or more dynamic bug contexts. (Block 816). The example static analyzer circuitry 308 and the example dynamic analyzer circuitry 310 determine the respective contexts using the location of the software bug identified in block 812. Block 816 is discussed in more detail below in in connection with FIG. 9.

The example context refiner circuitry 312 (FIG. 3) determines a refined bug context. (Block 818). To determine the refined bug context, the example context refiner circuitry 312 merges the static bug context and the one or more dynamic bug contexts generated at block 816. Block 818 is discussed in more detail below in connection with FIG. 10.

The example graph circuitry 302B generates a graph to represent the refined bug context of block 818. (Block 820). The example graph circuitry 302B may, but is not required to, match the format or procedure used to make the graph of block 804 when generating the graph of block 820.

The example context verifier circuitry 314 (FIG. 3) verifies the presence of a software bug in the refined bug context. (Block 822). Before the example process 800 begins and the example bug detector circuitry 104 accesses input code 201, the example context verifier circuitry 314 trains a neural network model to determine whether nodes contain software bugs as described in FIG. 5. During the example instructions or process 800, the example context verifier circuitry 314 implements the neural network model to verify that the refined bug context contains a software bug.

The example context verifier circuitry 314 provides example bug information 106 (FIG. 1) to the data provider circuitry 316 (FIG. 3) based on the verification. For example, if the example context verifier circuitry 314 successfully verifies there is a software bug in the refined bug context, the example context verifier circuitry 314 may provide the bug status 106A indicating that the input code 201 contains a software bug and provides the refined bug context as the bug context 106B to the data provider circuitry 316. If the example context verifier circuitry 314 cannot successfully verify there is a software bug in the refined bug context, the example context verifier circuitry 314 may provide the bug status 106A indicating that the input code 201 does not contain a software bug and may not provide a bug context 106B to the data provider circuitry 316.

The data provider circuitry 316 returns example bug information 106. (Block 824). Bug information 106 includes the bug status 106A and may conditionally include a bug context 106B. For example, the data provider circuitry 316 may provide different results based on the contents of the bug information 106 provided by the example context verifier circuitry 314 in block 822. In examples where the bug-relevant probabilities do not satisfy the threshold of block 808, the data provider circuitry 316 may provide the bug status 106A indicating the input code 201 does not have a software bug and may not provide a bug context 106B. Similarly, in examples where the input code 201 does not contain sufficient bug context as described in block 814, the data provider circuitry 316 may provide the bug status 106A indicating the input code 201 does contain a software bug and provide the partial bug context of block 812 as the bug context 106B rather than a refined bug context.

The example data provider circuitry 316 provides bug information 106 to the example software interface circuitry 210. After the example bug detector circuitry 104 determines the bug status 106A for the input code 201, the input code 201 may then be considered reference code 202. In some examples, the data provider circuitry 316 may additionally provide reference code 202 to the compiler circuitry 212 in block 824. In some examples, a determination of whether to provide the reference code 202 is based on the example bug information 106. In other examples, the data provider circuitry 316 may provide the reference code 202 to the compiler circuitry 212 regardless of the example bug information 106. The example instructions or process 800 ends after block 824.

Figure 9:
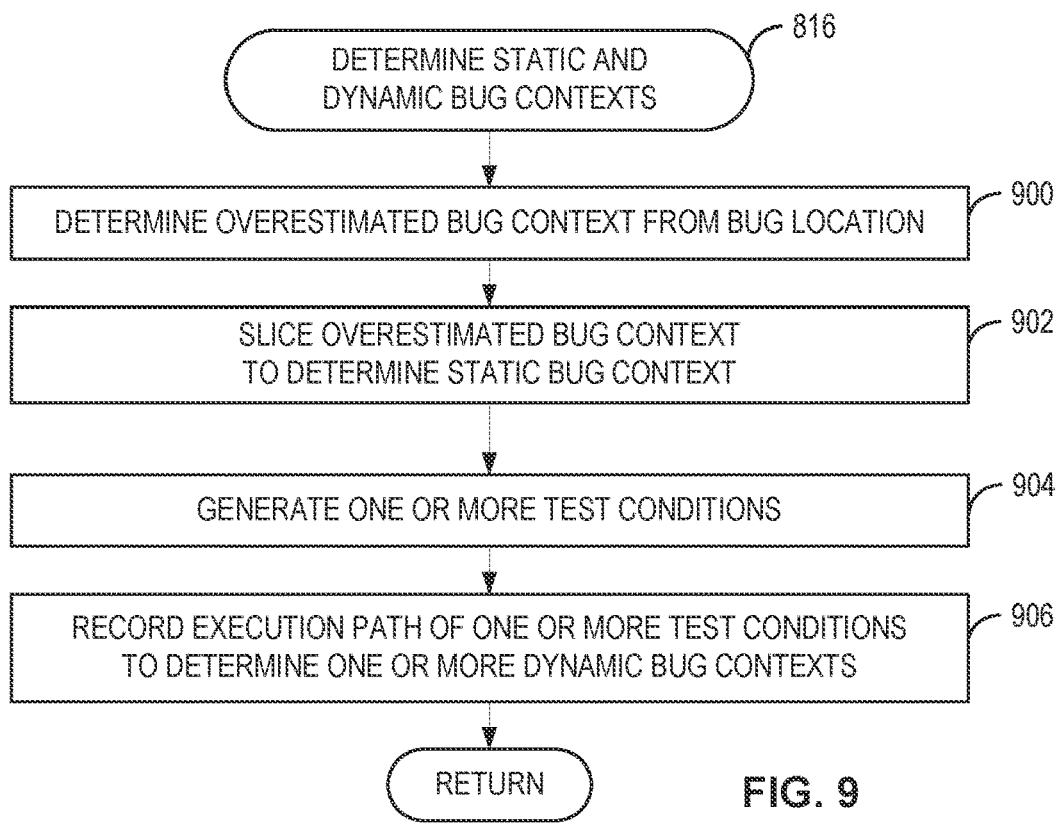
FIG. 9 is flowchart representative of example machine readable instructions that may be executed by example processor circuitry to implement the example static analyzer circuitry and example dynamic analyzer circuitry of FIG. 3 to determine static and dynamic bug contexts as described in FIG. 8.

FIG. 9 is flowchart representative of example machine readable instructions that may be executed by example processor circuitry to implement the example static analyzer circuitry 308 and the example dynamic analyzer circuitry 310 of FIG. 3 to determine static and dynamic bug contexts. The example instructions of FIG. 9 may be used to implement block 816 of FIG. 8. The execution flow of the example instructions 816 begins when the example static analyzer circuitry 308 determines overestimated bug context from a location of a software bug. (Block 900). For example, the static analyzer circuitry 308 determines the overestimated bug context from the location of the software bug identified in block 812 of FIG. 8. In the example of FIG. 9, the overestimated bug context refers to all the code within any of the functions that influence the one or more bug-relevant nodes of block 810 of FIG. 8. The example static analyzer circuitry 308 may use tools such as Clang™ static analysis program or the CppDepend™ static analysis program to determine the overestimated bug context.

The example static analyzer circuitry 308 slices the overestimated bug context to determine a static bug context. (Block 902). The overestimated bug context is sliced so that the static bug context excludes portions of the input code 201 that do not directly relate to the one or more points of interest indicated in the one or more bug-relevant nodes.

The example dynamic analyzer circuitry 310 generates one or more test conditions. (Block 904). A test condition refers to the set of inputs that, when ran with the input code 201, have a specific execution flow. The example dynamic analyzer circuitry 310 may implement automatic test case generation tools such as FUDGE to generate the one or more test conditions.

The example dynamic analyzer circuitry 310 records the execution path of one or more test conditions to determine one or more dynamic bug contexts. (Block 906). The lines of code recorded during execution may be considered a dynamic bug context. The instructions 816 end, and control returns to the instructions of FIG. 8.

Figure 10:
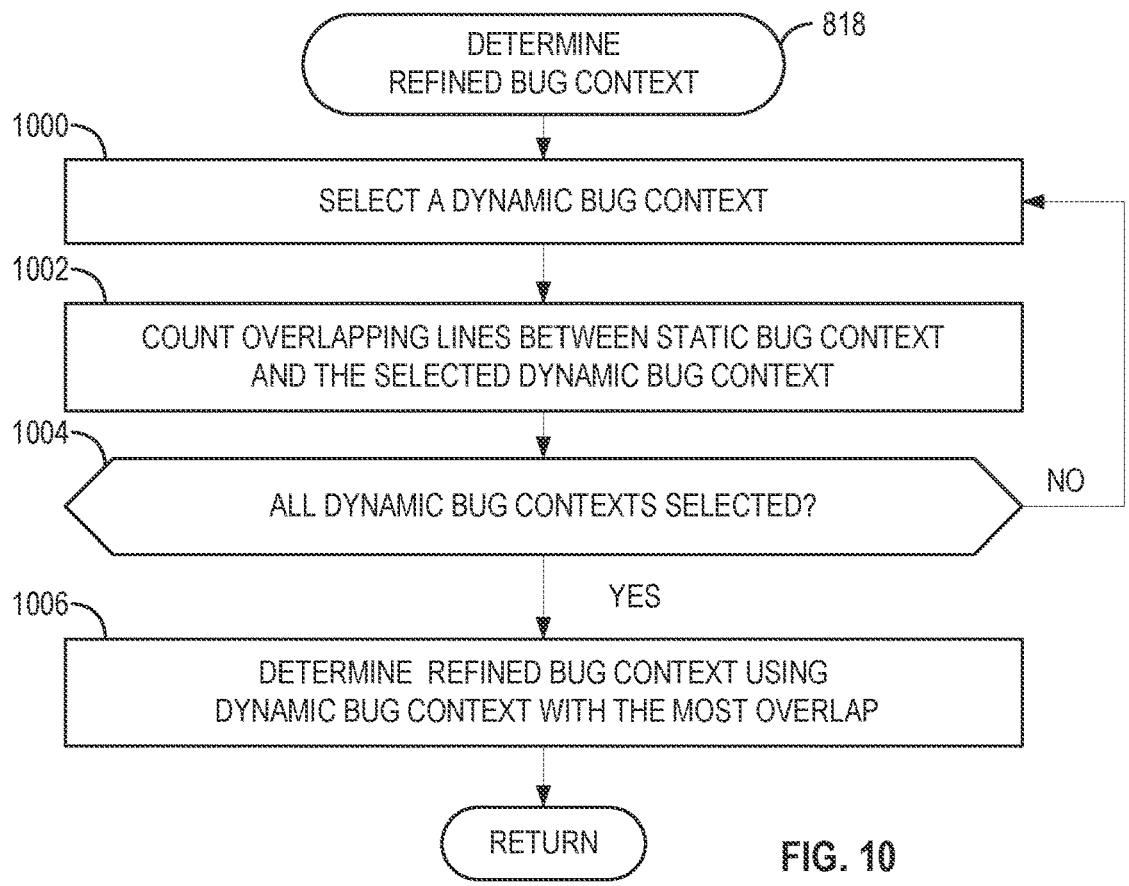
FIG. 10 is flowchart representative of example machine readable instructions that may be executed by example processor circuitry to implement the example context refiner circuitry of FIG. 3 to refine bug contexts as described in FIG. 8.

FIG. 10 is flowchart representative of example machine readable instructions that may be executed by example processor circuitry to implement the example context refiner circuitry 312 of FIG. 3 to refine bug context. The example instructions of FIG. 10 may be used to implement block 818 of FIG. 8. The example instructions 818 begin when the example context refiner circuitry 312 selects a dynamic bug context. (Block 1000). The selected dynamic bug context is part of the one or more dynamic bug contexts provided by the example dynamic analyzer circuitry 310 in block 816 of FIG. 8.

The example context refiner circuitry 312 counts overlapping lines between the static bug context and the selected dynamic bug context. (Block 1002). The static bug context is provided by the example static analyzer circuitry 308 in block 816 of FIG. 8.

The example context refiner circuitry 312 determines whether all dynamic bug contexts were selected. (Block 1004). For example, the context refiner circuitry 312 may determine whether all dynamic bug contexts were selected by assigning an index to each dynamic bug context of block 906 and determining whether the index of the selected dynamic bug context equals the total number of dynamic bug contexts. If the example context refiner circuitry 312 determines at block 1004 that all dynamic bug contexts are not selected, control returns to block 1000, where the example context refiner circuitry 312 selects a dynamic bug context that has not been selected. However, if the example context refiner circuitry 312 determines at block 1004 that all dynamic bug contexts are selected, control proceeds to block 1006.

The example context refiner circuitry 312 determines a refined bug context using the dynamic bug context with the most overlap. (Block 1006). For example, the example context refiner circuitry 312 determines which of the one or more dynamic bug contexts had the largest overlap count from block 1002. The overlapping lines with the largest overlap count may collectively be referred to as the refined bug context. The instructions 818 of FIG. 10 end, and control returns to block 820.

Figure 11:
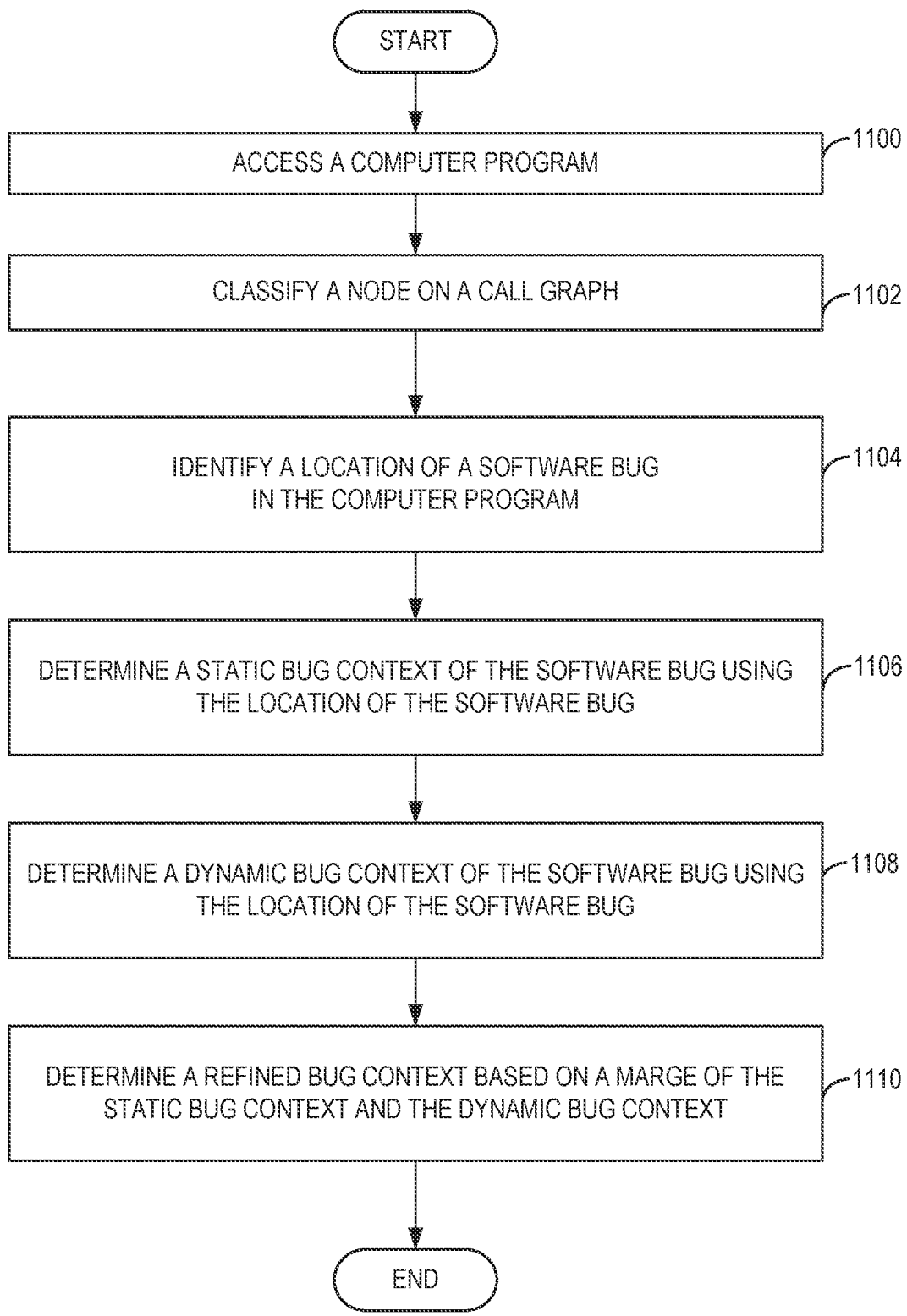
FIG. 11 is a flowchart representative of example machine readable instructions that may be executed by example processor circuitry to implement the bug detector circuitry of FIG. 1 to determine refined contexts for software bug detection.

FIG. 11 is a flowchart representative of example machine readable instructions that may be executed by example processor circuitry to implement the bug detector circuitry 104 of FIGS. 1, 2, and 3 to determine refined context for software bug detection.

The example bug detector circuitry 104 accesses a computer program. (Block 1100). For example, the example interface circuitry 300 accesses programming code of the computer program.

The example bug detector circuitry 104 classifies a node on a call graph. (Block 1102). For example, the example graph circuitry 302A generates a call graph to represent the computer program, and the example node classifier circuitry 304 classifies the node which includes the partial bug context corresponding to the computer program.

The example bug detector circuitry 104 identifies a location of a software bug in the computer program. (Block 1104). For example, the example location identifier circuitry 306 identifies the location of the software bug in the computer program based on the node classified at block 1102.

The example bug detector circuitry 104 determines a static bug context of the software bug using the location of the software bug. (Block 1106). For example, the example static analyzer circuitry 308 determines an overestimated bug context and uses program slicing tools to determine a static bug context from the overestimated bug context as described in FIGS. 6 and 9.

The example bug detector circuitry 104 determines a dynamic bug context of the software bug using the location of the software bug. (Block 1108). For example, the example dynamic analyzer circuitry 310 generates one or more test conditions and uses program slicing tools to determine a static bug context from the overestimated bug context as described in FIGS. 6 and 9.

The example bug detector circuitry 104 determines a refined bug context based on a merge of the static bug context and the dynamic bug context. (Block 1110). For example, the example context refiner circuitry 312 determines refined bug context by identifying which dynamic bug context has the most overlap with the static bug context as described in block 1006.

Figure 12:
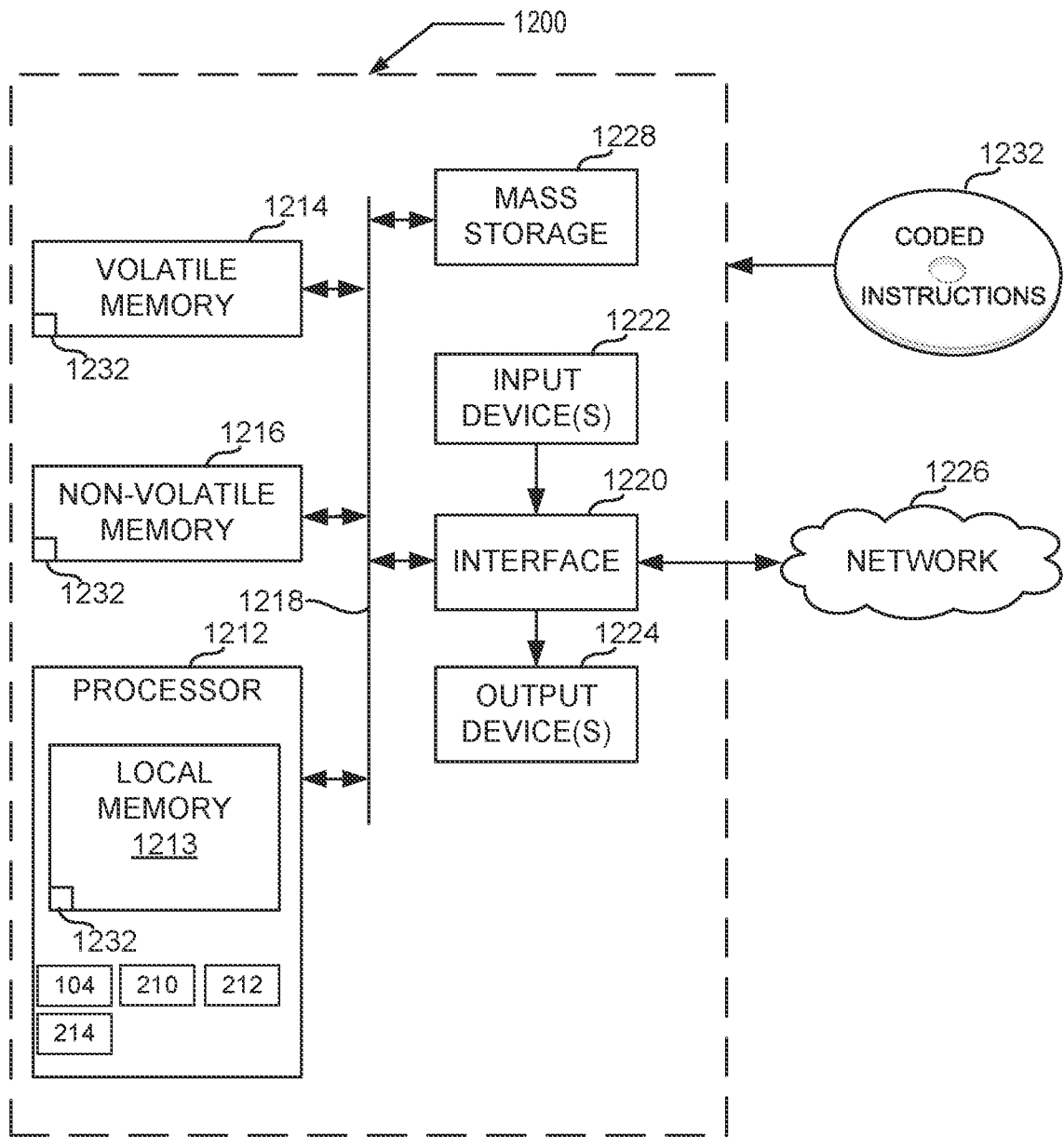
FIG. 12 is a block diagram of an example processing platform including processor circuitry structured to execute the example machine readable instructions of FIGS. 7, 8, 9, and/or 10 to implement the example bug detector circuitry of FIG. 1.

FIG. 12 is a block diagram of an example processor platform 1200 structured to execute and/or instantiate the machine readable instructions and/or the operations of FIGS. 8-11 to implement the example bug detector circuitry 104 of FIGS. 1-3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements software interface circuitry 210, example bug detector circuitry 104, compiler circuitry 212, code executor circuitry 214, example interface circuitry 300, example graph circuitry 302A, example node classifier circuitry 304, example location identifier circuitry 306, example static analyzer circuitry 308, example dynamic analyzer circuitry 310, example context refiner circuitry 312, example graph circuitry 302B, example context verifier circuitry 314, and example data provider circuitry 316.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1232, which may be implemented by the machine readable instructions of FIG. 12, may be stored in the mass storage device 1228, in the volatile memory 1214, in the non-volatile memory 1216, and/or on a removable non-transitory computer readable storage medium such as a CD or DVD.

Figure 13:
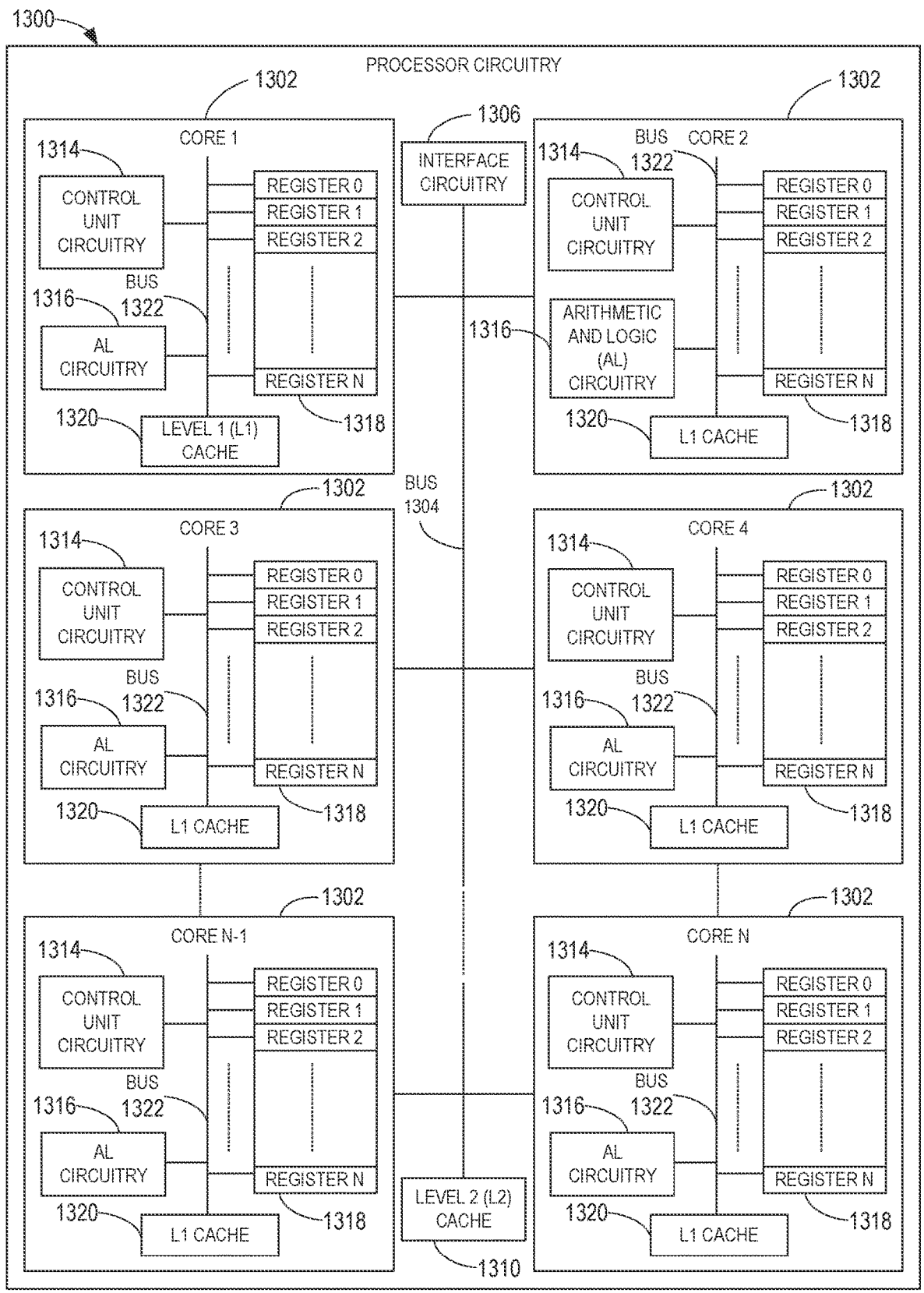
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 8, 9, 10, and 11 to effectively instantiate the circuitry of FIG. 1 as logic circuits to perform the operations corresponding to those machine readable instructions. In some such examples, the circuitry of FIG. 1 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIG. 8-11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
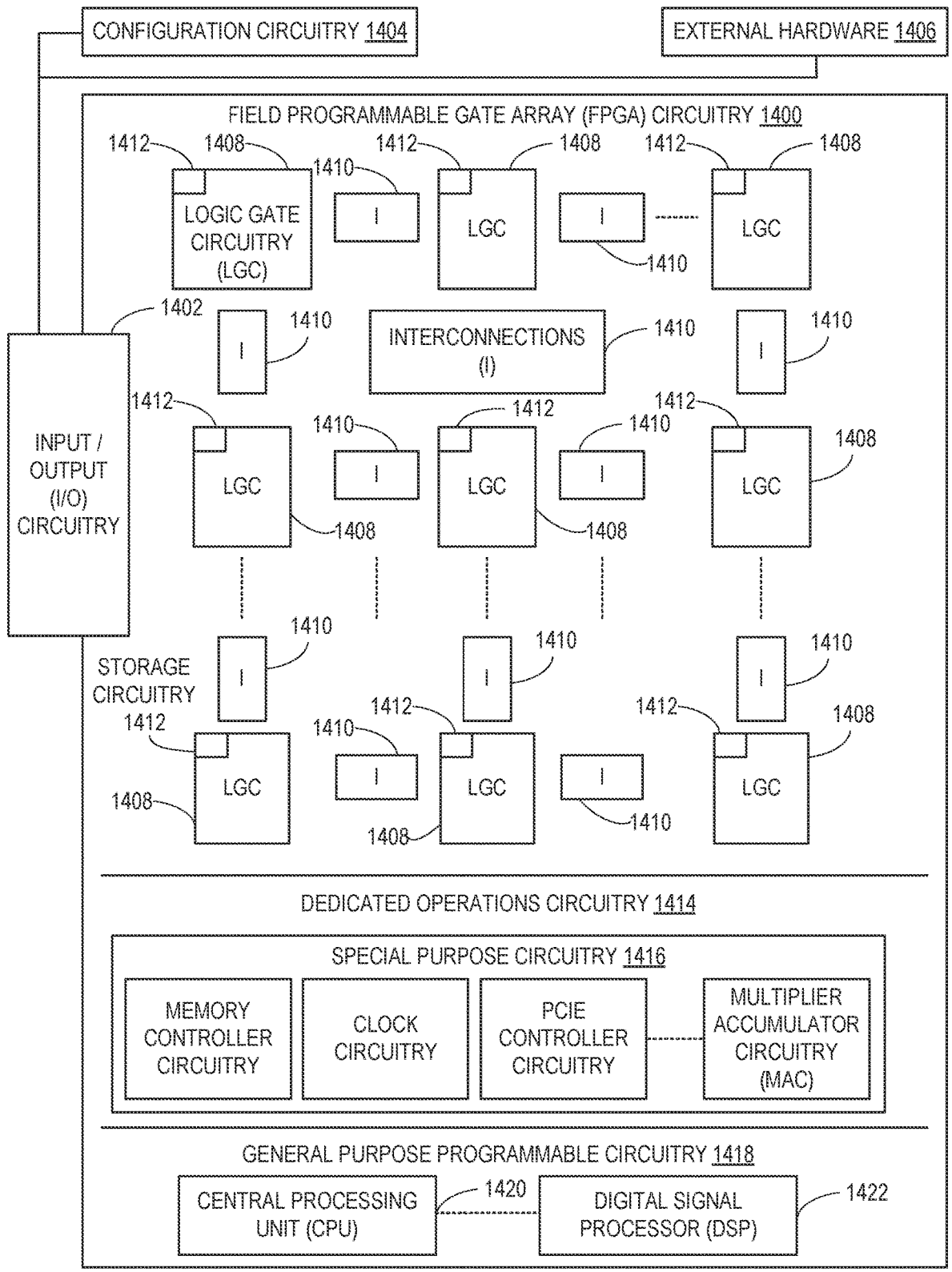
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 8-11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 8-11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 8-11. As such, the FPGA circuitry 1400 may be structured to effectively instantiate some or all of the machine readable instructions of the flowcharts of FIGS. 8-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 12 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIG. 12 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 8-11 may be executed by one or more of the cores 1302 of FIG. 13, a second portion of the machine readable instructions represented by the flowcharts of FIGS. 8-11 may be executed by the FPGA circuitry 1400 of FIG. 14, and/or a third portion of the machine readable instructions represented by the flowcharts of FIGS. 8-11 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
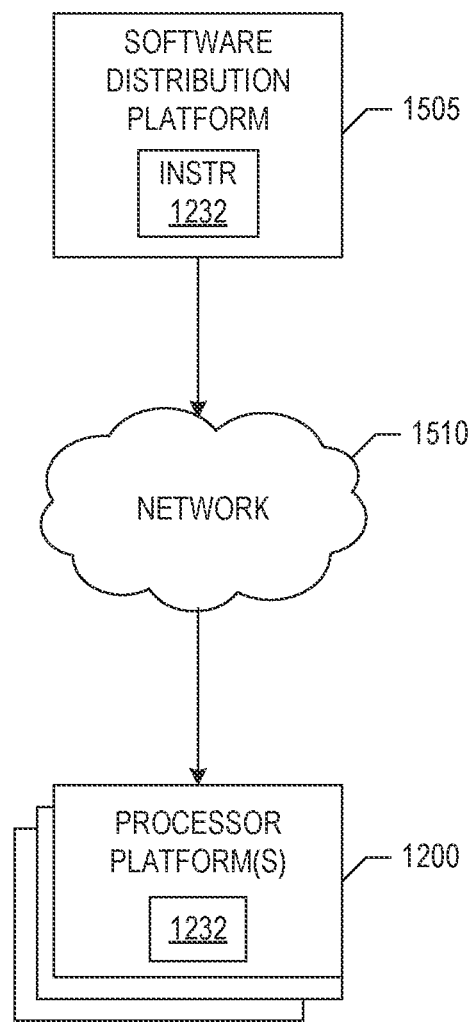
FIG. 15 is a block diagram of an example software distribution platform (e.g., one or more servers) to distribute software (e.g., software corresponding to the example machine readable instructions of FIGS. 7, 8, 9, and/or 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions of FIGS. 8-11, as described above. The one or more servers of the example software distribution platform 1505 are in communication with a network 1510, which may correspond to any one or more of the Internet and/or any of the example networks 204 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions of FIGS. 8-11, may be downloaded to the example processor platform 1200, which is to execute the machine readable instructions 1232 to implement the example bug detector circuitry 104. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that determine refined context for software bug correction. Disclosed systems, methods, apparatus, and articles of manufacture improve the efficiency of using a computing device by providing a greater portion of bug context than previous solutions, which allows for more accurate and efficient software bug correction. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine refined context for software bug detection and/or correction are disclosed herein. Further examples and combinations thereof include the following.

Example 1 includes an apparatus to determine refined context for software bug detection comprising interface circuitry to access a computer program, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate node classifier circuitry to classify a node on a graph, the graph to represent the computer program, the node to represent a partial bug context corresponding to the computer program, location identifier circuitry to identify a location of a software bug in the computer program, the location based on the node, static analyzer circuitry to determine a static bug context of the software bug using the location of the software bug, dynamic analyzer circuitry to determine a dynamic bug context of the software bug using the location of the software bug, and context refiner circuitry to determine a refined bug context based on a merge of the static bug context and the dynamic bug context.

Example 2 includes the apparatus of example 1, wherein the node classifier circuitry is to generate a probability that the node contains the software bug, the probability based on a neural network, the neural network trained using committed code in a code repository.

Example 3 includes the apparatus of example 2, wherein the node classifier circuitry is to classify the node as containing the software bug if the probability satisfies a threshold.

Example 4 includes the apparatus of example 1, wherein the location identifier circuitry is to identify the location based on mapping rules.

Example 5 includes the apparatus of example 1, wherein the node classifier circuitry is to classify multiple nodes as containing the software bug, and the location identifier circuitry is to determine a union of code locations as the location of the software bug, the union of code locations representing the multiple nodes.

Example 6 includes the apparatus of example 1, wherein the static bug context is a portion of the computer program that affects the behavior of the location of the software bug.

Example 7 includes the apparatus of example 1, wherein the dynamic analyzer circuitry is to run the computer program with a test condition, the dynamic bug context to represent an execution path of the test condition, the execution path to include the location of the software bug.

Example 8 includes the apparatus of example 1, wherein the dynamic analyzer circuitry is to determine a first dynamic bug context and a second dynamic bug context, the context refiner circuitry to determine the dynamic bug context from the first dynamic bug context and the second dynamic bug context, the dynamic bug context determined based on a first overlap between the first dynamic bug context and the static bug context being greater than a second overlap between the second dynamic bug context and the static bug context.

Example 9 includes the apparatus of example 1, further including context verifier circuitry to verify the refined bug context contains the software bug, the verification based on a binary classifier, the binary classifier trained using committed code in a code repository.

Example 10 includes At least one non-transitory machine-readable medium comprising instructions that, when executed, cause at least one processor to at least classify a node on a graph, the graph to represent a computer program, the node to represent a partial bug context corresponding to the computer program, identify a location of a software bug in the computer program, the location based on the node, determine a static bug context of the software bug using the location of the software bug, determine a dynamic bug context of the software bug using the location of the software bug, and determine a refined bug context based on a merge of the static bug context and the dynamic bug context.

Example 11 includes the at least one non-transitory machine-readable medium of example 10, wherein the instructions, when executed, cause the at least one processor to generate a probability that the node contains the software bug, the probability based on a neural network, the neural network trained using a committed code in a code repository.

Example 12 includes the at least one non-transitory machine-readable medium of example 11, wherein the instructions, when executed, cause the at least one processor to classify the node as containing the software bug if the probability satisfies a threshold.

Example 13 includes the at least one non-transitory machine-readable medium of example 10, wherein the instructions, when executed, cause the at least one processor to identify the location based on mapping rules.

Example 14 includes the at least one non-transitory machine-readable medium of example 10, wherein the instructions, when executed, cause the at least one processor to classify multiple nodes as containing the software bug, and determine a union of code locations as the location of the software bug, the union of code locations representing the multiple nodes.

Example 15 includes the at least one non-transitory machine-readable medium of example 10, wherein the static bug context is a portion of the computer program that affects the behavior of the location of the software bug.

Example 16 includes the at least one non-transitory machine-readable medium of example 10, wherein the instructions, when executed, cause the at least one processor to run the computer program with a test condition, the dynamic bug context to represent an execution path of the test condition, the execution path to include the location of the software bug.

Example 17 includes the at least one non-transitory machine-readable medium of example 10, wherein the instructions, when executed, cause the at least one processor to determine a first dynamic bug context and a second dynamic bug context, the dynamic bug context determined from the first dynamic bug context and the second dynamic bug context, the dynamic bug context determined based on a first overlap between the first dynamic bug context and the static bug context being greater than a second overlap between the second dynamic bug context and the static bug context.

Example 18 includes the at least one non-transitory machine-readable medium of example 10, wherein the instructions, when executed, cause the at least one processor to verify the refined bug context contains the software bug, the verification based on a binary classifier, the binary classifier trained using committed code in a code repository.

Example 19 includes a method to determine refined context for software bug detection, the method comprising classifying a node on a graph, the graph to represent a computer program, the node to represent a partial bug context corresponding to the computer program, identifying a location of a software bug in the computer program, the location based on the node, determining a static bug context of the software bug using the location of the software bug, determining a dynamic bug context of the software bug using the location of the software bug, and determining a refined bug context based on a merge of the static bug context and the dynamic bug context.

Example 20 includes the method of example 19, further including generating a probability that the node contains the software bug, the probability based on a neural network, the neural network trained using committed code in a code repository.

Example 21 includes the method of example 20, further including classifying the node as containing the software bug if the probability satisfies a threshold.

Example 22 includes the method of example 19, further including identifying the location based on mapping rules.

Example 23 includes the method of example 19, further including classifying multiple nodes as containing the software bug and determining a union of code locations as the location of the software bug, the union of code locations representing the multiple nodes.

Example 24 includes the method of example 19, wherein the static bug context is a portion of the computer program that affects the behavior of the location of the software bug.

Example 25 includes the method of example 19, further including running the computer program with a test condition, the dynamic bug context to represent an execution path of the test condition, the execution path to include the location of the software bug.

Example 26 includes the method of example 19, further including determining a first dynamic bug context and a second dynamic bug context, the dynamic bug context determined from the first dynamic bug context and the second dynamic bug context, the dynamic bug context determined based on a first overlap between the first dynamic bug context and the static bug context being greater than a second overlap between the second dynamic bug context and the static bug context.

Example 27 includes the method of example 19, further including verifying the refined bug context contains the software bug, the verification based on a binary classifier, the binary classifier trained using committed code in a code repository.

Example 28 includes an apparatus to determine refined context for software bug detection comprising means for classifying a node on a graph, the graph to represent a computer program, the node to contain partial bug context corresponding to the computer program, means for identifying a location of a software bug in the computer program, the location based on the node, means for determining a static bug context of the software bug using the location of the software bug, means for determining a dynamic bug context of the software bug using the location of the software bug, and means for determining a refined bug context based on a merge of the static bug context and the dynamic bug context.

Example 29 includes the apparatus of example 28, further including means for generating a probability that the node contains the software bug, the probability based on a neural network, the neural network trained using committed code in a code repository.

Example 30 includes the apparatus of example 29, further including means for classifying the node as containing the software bug if the probability satisfies a threshold.

Example 31 includes the apparatus of example 28, further including means for identifying the location based on mapping rules.

Example 32 includes the apparatus of example 28, further including means for classifying multiple nodes as containing the software bug and determining a union of code locations as the location of the software bug, the union of code locations representing the multiple nodes.

Example 33 includes the apparatus of example 28, wherein the static bug context is a portion of the computer program that affects the behavior of the location of the software bug.

Example 34 includes the apparatus of example 28, further including means for running the computer program with a test condition, the dynamic bug context to represent an execution path of the test condition, the execution path to include the location of the software bug.

Example 35 includes the apparatus of example 28, further including means for determining a first dynamic bug context and a second dynamic bug context, the dynamic bug context determined from the first dynamic bug context and the second dynamic bug context, the dynamic bug context determined based on a first overlap between the first dynamic bug context and the static bug context being greater than a second overlap between the second dynamic bug context and the static bug context.

Example 36 includes the apparatus of example 28, further including means for verifying the refined bug context contains the software bug, the verification based on a binary classifier, the binary classifier trained using committed code in a code repository.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine refined context for software bug detection comprising:
   interface circuitry to access a computer program; and
   programmable circuitry including one or more of:
   at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
   Application Specific Integrate Circuitry (ASIC) including logic gate circuitry to perform one or more third operations;
   the programmable circuitry to perform at least one of the first operations, the second operations, or the third operations to instantiate:
   node classifier circuitry to classify a node on a graph, the graph to represent the computer program, the node to represent a partial bug context corresponding to the computer program;
   location identifier circuitry to identify a location of a software bug in the computer program, the location based on the node;
   static analyzer circuitry to determine a static bug context of the software bug using the location of the software bug;
   dynamic analyzer circuitry to determine a first dynamic bug context of the software bug using the location of the software bug; and
   context refiner circuitry to determine a refined bug context based on:
   a count of overlapping lines between (a) the static bug context and the first dynamic bug context and (b) the static bug context and a second dynamic bug context:
   a selection of a largest one of the count of overlapping lines; and
   a merge of the static bug context, the first dynamic big context, and the second dynamic bug context.

2. The apparatus of claim 1, wherein the node classifier circuitry is to generate a probability that the node contains the software bug, the probability based on a neural network, the neural network trained using committed code in a code repository.

3. The apparatus of claim 2, wherein the node classifier circuitry is to classify the node as containing the software bug if the probability satisfies a threshold.

4. The apparatus of claim 1, wherein the location identifier circuitry is to identify the location based on mapping rules.

5. The apparatus of claim 1, wherein the node classifier circuitry is to classify multiple nodes as containing the software bug, and the location identifier circuitry is to determine a union of code locations as the location of the software bug, the union of code locations representing the multiple nodes.

6. The apparatus of claim 1, wherein the static bug context is a portion of the computer program that affects the behavior of the location of the software bug.

7. The apparatus of claim 1, wherein the dynamic analyzer circuitry is to run the computer program with a test condition, the dynamic bug context to represent an execution path of the test condition, the execution path to include the location of the software bug.

8. The apparatus of claim 1, further including context verifier circuitry to verify the refined bug context contains the software bug, the verification based on a binary classifier, the binary classifier trained using committed code in a code repository.

9. At least one non-transitory machine-readable medium comprising instructions to cause programmable circuitry to at least:
   classify a node on a graph, the graph to represent a computer program, the node to represent a partial bug context corresponding to the computer program;
   identify a location of a software bug in the computer program, the location based on the node;
   determine a static bug context of the software bug using the location of the software bug;
   determine a first dynamic bug context of the software bug using the location of the software bug; and
   determine a refined bug context based on:
   a count of overlapping lines between (a) the static bug context and the first dynamic bug context and (b) the static bug context and a second dynamic bug context;
   a selection of a largest one of the count of overlapping lines; and
   a merge of the static bug context, the first dynamic big context, and the second dynamic bug context.

10. The at least one non-transitory machine-readable medium of claim 9, wherein the instructions cause the programmable circuitry to generate a probability that the node contains the software bug, the probability based on a neural network, the neural network trained using a committed code in a code repository.

11. The at least one non-transitory machine-readable medium of claim 10, wherein the instructions cause the programmable circuitry to classify the node as containing the software bug if the probability satisfies a threshold.

12. The at least one non-transitory machine-readable medium of claim 9, wherein the instructions cause the programmable circuitry to identify the location based on mapping rules.

13. The at least one non-transitory machine-readable medium of claim 9, wherein the instructions cause the programmable circuitry to:
   classify multiple nodes as containing the software bug; and
   determine a union of code locations as the location of the software bug, the union of code locations representing the multiple nodes.

14. The at least one non-transitory machine-readable medium of claim 9, wherein the static bug context is a portion of the computer program that affects the behavior of the location of the software bug.

15. The at least one non-transitory machine-readable medium of claim 10, wherein the instructions cause the programmable circuitry to run the computer program with a test condition, the dynamic bug context to represent an execution path of the test condition, the execution path to include the location of the software bug.

16. The at least one non-transitory machine-readable medium of claim 9, wherein the instructions cause the programmable circuitry to verify the refined bug context contains the software bug, the verification based on a binary classifier, the binary classifier trained using committed code in a code repository.

17. A method to determine refined context for software bug detection, the method comprising:
 classifying a node on a graph, the graph to represent a computer program, the node to represent a partial bug context corresponding to the computer program;
 identifying a location of a software bug in the computer program, the location based on the node;
 determining a static bug context of the software bug using the location of the software bug;
 determining a first dynamic bug context of the software bug using the location of the software bug; and
 determining a refined bug context based on:
  a count of overlapping lines between (a) the static bug context and the first dynamic bug context and (b) the static bug context and a second dynamic bug context;
  a selection of a largest one of the count of overlapping lines; and
  a merge of the static bug context, the first dynamic big context, and the second dynamic bug context.

18. The method of claim 17, further including generating a probability that the node contains the software bug, the probability based on a neural network, the neural network trained using committed code in a code repository.

19. The method of claim 18, further including classifying the node as containing the software bug if the probability satisfies a threshold.

20. The method of claim 17, further including identifying the location based on mapping rules.

21. An apparatus to determine refined context for software bug detection comprising:
 means for classifying a node on a graph, the graph to represent a computer program, the node to contain partial bug context corresponding to the computer program;
 means for identifying a location of a software bug in the computer program, the location based on the node;
 means for determining a static bug context of the software bug using the location of the software bug;
 means for determining a first dynamic bug context of the software bug using the location of the software bug; and
 means for determining a refined bug context based on:
  a count of overlapping lines between (a) the static bug context and the first dynamic bug context and (b) the static bug context and a second dynamic bug context;
  a selection of a largest one of the count of overlapping lines; and
  a merge of the static bug context, the first dynamic big context, and the second dynamic bug context.

22. The apparatus of claim 21, further including means for generating a probability that the node contains the software bug, the probability based on a neural network, the neural network trained using committed code in a code repository.

23. The apparatus of claim 22, further including means for classifying the node as containing the software bug if the probability satisfies a threshold.

* * * * *